United States Patent
Duan et al.

(10) Patent No.: US 11,080,442 B2
(45) Date of Patent: Aug. 3, 2021

(54) SUBDOMAIN HYBRID CELLULAR AUTOMATA METHOD FOR SOLVING CAR BODY THICKNESS OPTIMIZATION

(71) Applicant: JIANGSU UNIVERSITY, Zhenjiang (CN)

(72) Inventors: Libin Duan, Zhenjiang (CN); Xin Luo, Zhenjiang (CN); Haobin Jiang, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 17/047,405

(22) PCT Filed: May 8, 2020

(86) PCT No.: PCT/CN2020/089175
§ 371 (c)(1),
(2) Date: Oct. 14, 2020

(87) PCT Pub. No.: WO2020/224634
PCT Pub. Date: Nov. 12, 2020

(65) Prior Publication Data
US 2021/0117595 A1    Apr. 22, 2021

(30) Foreign Application Priority Data

May 9, 2019 (CN) .......................... 201910384617.0
May 6, 2020 (CN) .......................... 202010373134.3

(51) Int. Cl.
*G06F 30/15* (2020.01)
*G06F 30/23* (2020.01)
(Continued)

(52) U.S. Cl.
CPC .............. *G06F 30/23* (2020.01); *G06F 30/15* (2020.01); *G06F 30/20* (2020.01); *G06F 30/373* (2020.01); *G06F 2111/04* (2020.01)

(58) Field of Classification Search
CPC .......... G06F 30/00; G06F 30/15; G06F 30/23; G06F 2111/04; G06F 2111/06; G06F 30/20; G06F 30/373
See application file for complete search history.

(56) References Cited

U.S. PATENT DOCUMENTS 8,880,380 B2 * 11/2014 Pydimarry .............. G06F 30/15
703/1
2007/0075450 A1 * 4/2007 Belegundu .............. B23P 17/00
264/40.1
(Continued)

FOREIGN PATENT DOCUMENTS

| CN | 105528494 A | 4/2016 |
| CN | 107885915 A | 4/2018 |
| CN | 110287512 A | 9/2019 |

OTHER PUBLICATIONS

N. M. Patel, B. S. Kang, J. E. Renaud, "Crashworthiness Design using a hyprid cellular automaton algorithm" pp. 1-12, (Year: 2006).*
(Continued)

*Primary Examiner* — Kibrom K Gebresilassie
(74) *Attorney, Agent, or Firm* — Bayramoglu Law Offices LLC

(57) ABSTRACT

A subdomain hybrid cellular automata method for solving car body thickness optimization includes an outer loop and an inner loop: the outer loop is to conduct crash finite element simulation analysis, calculate an output response, and update a cell internal energy density, and update a target mass using a penalty function method; the inner loop is mainly to adjust a cell thickness using a PID control strategy (Continued)

according to internal energy densities of a current cell and neighboring cells thereof, so that a current mass of the inner loop converges to the target mass; and finally the cell internal energy density distribution approaches a step target internal energy density function as much as possible. Step target internal energy density update rules are provided in the inner loop. Cell thickness update rules based on a PID control strategy are provided in the inner loop.

7 Claims, 15 Drawing Sheets

(51) Int. Cl.
    *G06F 111/04*     (2020.01)
    *G06F 30/20*     (2020.01)
    *G06F 30/373*     (2020.01)

(56) References Cited

U.S. PATENT DOCUMENTS

| | | | | |
|---|---|---|---|---|
| 2009/0164178 A1* | 6/2009 | Pydimarry | ............ | G06F 30/15 703/1 |
| 2010/0262406 A1* | 10/2010 | Goel | ............ | G06F 30/23 703/2 |
| 2011/0137443 A1* | 6/2011 | Farahani | ............ | G06F 30/20 700/98 |
| 2011/0270587 A1* | 11/2011 | Yamada | ............ | G06F 30/17 703/1 |
| 2012/0051612 A1* | 3/2012 | Kitamura | ............ | G06T 7/149 382/128 |
| 2014/0214370 A1* | 7/2014 | Olhofer | ............ | G06F 30/15 703/1 |
| 2017/0161405 A1* | 6/2017 | Ishizuka | ............ | G06F 30/23 |

OTHER PUBLICATIONS

N. M. Patel, B. S. Kang, J. E. Renaud, "Multilevel Crashowrthiness Design using a Complaint Mechanism Approach" pp. 1-14, (Year: 2006).*

N. M. Patel, B. S. Kang, J. E. Renaud, "Topology Synthesis of Structures under Impact Loading using a Hybrid Cellular Automaton Algorithm", pp. 1-19, (Year: 2007).*

N. M. Patel, "Crashworthiness Design using Topology Optimization" pp. 1-199, (Year: 2007).*

C. K. Mozumder, P. Bandi, N. M. Patel, and J. E. Renaud, "Thickness based Topology Optimization for crashworthiness Design using Hybrid Cellular Automata", pp. 1-14, (Year: 2008).*

\* cited by examiner

SUBDOMAIN HYBRID CELLULAR AUTOMATA METHOD FOR SOLVING CAR BODY THICKNESS OPTIMIZATION

CROSS REFERENCE TO THE RELATED APPLICATIONS

This application is the national phase entry of International Application No. PCT/CN2020/089175, filed on May 8, 2020, which is based upon and claims priority to Chinese Patent Application No. 201910384617.0, filed on May 9, 2019, and Chinese Patent Application No. 202010373134.3, filed on May 6, 2020, the entire contents of which are incorporated herein by reference.

TECHNICAL FIELD

The present invention relates to the technical field of crashworthiness optimization for car body structures, and specifically to a subdomain hybrid cellular automata method for solving car body thickness optimization.

BACKGROUND

Finite element simulation of vehicle crash involves material nonlinearity, geometric nonlinearity, and contact boundary nonlinearity, and is a typical dynamic nonlinear analysis problem. In order to obtain desirable vehicle safety performance, crashworthiness optimization design for car body structures has been widely applied in the vehicle industry. Since the output response of crash simulation has numerical noise and physical oscillation phenomena, a gradient-based optimization algorithm cannot effectively solve crashworthiness optimization problems for car body structures. In addition, a full-scale vehicle crash simulation requires a lot of computation time, and an evolutionary algorithm usually requires thousands of finite element simulation analyses, resulting in lengthy optimization. A surrogate model-based numerical optimization method is the main way to solve the aforementioned problems, and classical algorithms include PSP algorithm, parallel EGO algorithm based on pseudo EI criterion, and so on. However, when a large number of (for example, 30 or even more) design variables exist, the optimization efficiency of most surrogate model-based optimization algorithms is greatly reduced.

A hybrid cellular automata (HCA) method, as a non-gradient heuristic algorithm, has the following advantages for solving crashworthiness optimization problems for thin-walled structures: 1) gradient information does not need to be calculated in the optimization process, which has a great advantage in solving complex nonlinear optimization problems where sensitivity information is hard to obtain: 2) the crashworthiness performance of the structures can be rapidly improved without requiring a large number of finite element simulations; 3) the optimization problem with a large scale of design variables can be solved without significantly increasing the computation time.

The car body is a three-dimensional space frame structure formed by a large number of thin-walled structures, and the crashworthiness optimization design for a car body structure is a typical nonlinear dynamic response optimization problem in a discrete design space, and such problems usually involve thickness design variables of a large number of different parts. Efficient methods for solving a nonlinear dynamic response optimization problem with a large scale of thickness variables in a discrete design space are limited in the existing research.

SUMMARY

In view of the deficiencies in the prior art, the present invention provides a subdomain hybrid cellular automata method for solving car body thickness optimization (Thickness-based Subdomain Hybrid Cellular Automata, T-Subdomain HCA), which can efficiently solve a nonlinear dynamic response optimization problem with a large scale of thickness variables.

The present invention achieves the aforementioned technical objective by the following technical means.

A subdomain hybrid cellular automata method (T-Subdomain HCA) for solving car body thickness optimization includes the following steps:

S1. building an initially designed crash finite element model for thickness optimization of a car body structure;

S2. building a subdomain cellular automata model for thickness optimization of a car body structure, and defining thickness variables and field variables;

S3. executing an outer loop: obtaining a cell internal energy density and a constraint function value at a current design point through simulation analysis, and updating a target mass using a penalty function method according to an extent to which the current design point violates a constraint boundary;

S4. executing an inner loop:

S4.1. constructing a step target internal energy density function, and updating target internal energy density;

S4.2. updating cell thicknesses using cell thickness update rules based on a PID control strategy;

S4.3. judging whether the inner loop converges: if a convergence condition is not satisfied, returning to S4.1; if the convergence condition is satisfied, exiting the inner loop and performing S5;

S5: judging whether the outer loop converges: if global convergence conditions are not satisfied, returning to S3 and updating the cell thicknesses using the inner loop; if the global convergence conditions are satisfied, outputting an optimization result.

Further, the subdomains are subdomains in a discrete design space, and a cellular automata model defined for each subdomain includes a current cell and neighboring cells thereof.

Furthermore, the cell type includes one-dimensional cellular automata, two-dimensional cellular automata, and three-dimensional cellular automata.

Further, a process of constructing the step target internal energy density function is:

S4.1.1. according to subscripts i and j of a cell $\Omega_{i,j}$, defining a sequence number for the cell using id (i, j)= $\hat{N}_{\Omega_{i-1}}*(i-1)+j$, $j \in [1, \hat{N}_{\Omega_i}]$, $\hat{N}_{\Omega_0}=0$, where $\hat{N}_{\Omega_{i-1}}$ is the number of cells in an (i−1)th subdomain;

S4.1.2. traversing all cells, and calculating a difference between internal energy densities $S_{id}^{(k)}$ of all cells and an average $\overline{S}^{(k)}$ thereof in a kth outer loop: $\Delta S_{id}^{(k)} = S_{id}^{(k)} - \overline{S}^{(k)}$, where $$\overline{S}^{(k)} = \frac{1}{\sum_{i=1}^{I} \hat{N}_{\Omega_i}} \sum_{i=1}^{I} \sum_{j=1}^{\hat{N}_{\Omega_i}} S_{\Omega_{i,j}}^{(k)}$$

is the average of the internal energy densities of all cells in the kth outer loop;

S4.1.3. determining "step points" and "step intervals": traversing all cells, and when $\Delta S_{id}^{(k)} * \Delta S_{id+1}^{(k)} < 0$ is established, defining a subscript id of $\Delta S_{id}^{(k)}$ as a "step point," where m "step points" are capable of forming m+1 "step intervals";

S4.1.4. updating the "step points" and "step intervals": if $id_{i+1} - id_i + 1 < H_{threshod}$ is established, when i=1, deleting a "step point" $id_1$, and a "step interval" is updated from $[id_0, id_1]$ to $[id_0, id_2]$; when i>1, deleting a "step point" $id_{i-1}$, and a "step interval" is updated from $[id_{i-1}, id_i]$ to $[id_{i-2}, id_i]$; if $id_{i+1} - id_i + 1 < H_{threshold}$ is not established, retaining the original "step points" and "step intervals";

S4.1.5. constructing the step target internal energy density function:

$$S^{*(h,k)} = \begin{cases} S_1^{*(h,k)}, & 1 \le id \le id_1 \\ S_2^{*(h,k)}, & id_1 < id \le id_2 \\ \ldots \\ S_i^{*(h,k)}, & id_{i-1} < id \le id_i \\ \ldots \\ S_{m'}^{*(h,k)}, & id_{m'-1} < id \le id_{m'} \\ S_{m'+1}^{*(h,k)}, & id_{m'} < id \le \sum_{i=1}^{l} \hat{N}_{\Omega_i} \end{cases}$$

where $S_i^{*(h,k)}$ is a target internal energy density in the "step interval" $[id_{i-1}, id_i]$ in the kth outer loop and an hth inner loop.

Furthermore, a formula used in updating the target internal energy density is:

$$S_i^{*(h+1,k)} = S_i^{*(h,k)} \frac{M^{(h,k)}}{M^{*(k)}}$$

where $M^{*(k)}$ represents a target mass obtained by update in the kth outer loop; $M^{(h,k)}$ represents a current mass obtained by thickness update in the kth outer loop and the hth inner loop.

Further, the cell thickness update rules based on the PID control strategy are:

a cell thickness update formula is:

$$t_{\Omega_{i,j}}^{(h+1,k)} = \begin{cases} t_{\Omega_{i,j}}^{min}, & t_{\Omega_{i,j}}^{(h,k)} + \Delta t_{\Omega_{i,j}}^{(h,k)} < t_{\Omega_{i,j}}^{min} \\ t_{\Omega_{i,j}}^{(h,k)} + \Delta t_{\Omega_{i,j}}^{(h,k)}, & t_{\Omega_{i,j}}^{min} \le t_{\Omega_{i,j}}^{(h,k)} + \Delta t_{\Omega_{i,j}}^{(h,k)} \le t_{\Omega_{i,j}}^{max} \\ t_{\Omega_{i,j}}^{max}, & t_{\Omega_{i,j}}^{(h,k)} + \Delta t_{\Omega_{i,j}}^{(h,k)} > t_{\Omega_{i,j}}^{max} \end{cases}$$

in the formula, $t_{\Omega_{i,j}}^{(h,k)}$ is a cell thickness of a jth cell in an ith subdomain $\Omega_i$ in the kth outer loop and the hth inner loop; $t_{\Omega_{i,j}}^{(h+1,k)}$ is a cell thickness of the jth cell in the ith subdomain $\Omega_i$ in the kth outer loop and an (h+1)th inner loop; $t_{\Omega_{i,j}}^{min}$ and $t_{\Omega_{i,j}}^{max}$ are respectively a minimum and a maximum of the cell thickness of the jth cell in the ith subdomain $\Omega_i$; $\Delta t_{\Omega_{i,j}}^{(h,k)}$ is a variation of the cell thickness of the jth cell in the ith subdomain $\Omega_i$ in the kth outer loop and the hth inner loop, and has an expression as follows:

$$\Delta t_{\Omega_{i,j}}^{(h,k)} = (t_{\Omega_{i,j}}^{max} - t_{\Omega_{i,j}}^{min}) f(e_{\Omega_{i,j}}^{(h,k)})$$

where $f(e_{\Omega_{i,j}}^{(h,k)})$ is a PID control function for cell thickness update, and has an expression as follows:

$$f(e_{\Omega_{i,j}}^{(h,k)}) = K_p e_{\Omega_{i,j}}^{(h,k)} + K_i \left[ e_{\Omega_{i,j}}^{(h,k)} + \sum_{\tau=1}^{k-1} e_{\Omega_{i,j}}^{(\tau)} \right] + K_d \times \left[ e_{\Omega_{i,j}}^{(h,k)} - e_{\Omega_{i,j}}^{(k-1)} \right]$$

where $K_p$ is a proportional control coefficient, $K_i$ is an integral control coefficient, $K_d$ is a differential control coefficient, $e_{\Omega_{i,j}}^{(\tau)}$ represents a relative deviation item of a τth outer loop, $e_{\Omega_{i,j}}^{(k-1)}$ represents a relative deviation item of a (k−1)th outer loop, and $e_{\Omega_{i,j}}^{(h,k)}$ represents a relative deviation item between an internal energy density $S_{\Omega_{i,j}}^{(k)}$ of the current cell and a target internal energy density $S_{m'}^{*(h,k)}$, and has a calculation formula as follows:

$$e_{\Omega_{i,j}}^{(h,k)} = \frac{S_{\Omega_{i,j}}^{(k)} - S_{m'}^{*(h,k)}}{S_{m'}^{*(h,k)}}.$$

Further, the convergence condition of the inner loop is: $|M^{(h,k)} - M^{*(k)}| < \varepsilon_1$ or $k_1 \ge k_{1max}$, where $M^{*(k)}$ represents a target mass obtained by update in the kth outer loop; $M^{(h,k)}$ represents a current mass obtained by thickness update in the kth outer loop and the hth inner loop, $\varepsilon_1$ is a mass convergence factor, $k_1$ represents the number of iterations in the inner loop, and $k_{1max}$ represents the maximum number of iterations in the inner loop.

Further, the global convergence conditions include:

(1) when the number of iterations k in the outer loop exceeds a predefined maximum number of iterations $k_{max}$, ending iteration;

(2) let $p_f$ represent the number of iterations where infeasible solutions continuously appear, and $P^*_f$ represent the maximum number of iterations where infeasible solutions continuously appear; when $p_f > p_f^*$, ending iteration;

(3) when the variation of design variables satisfies $$\sum_{i=1}^{N} |t_{\Omega_{i,j}}^{k} - t_{\Omega_{i,j}}^{k-1}| < \varepsilon_2,$$

ending iteration; in the formula, N represents the total number of cells, and $\varepsilon_2$ represents a global convergence factor.

The present invention has the following beneficial effects:

(1) the subdomain CA model of the present invention allows defining different types of cellular automata models $CA_{\Omega_i}$ in different subdomains, and allows using different types of cell state update rules $R_{\Omega_i}$ in different subdomains, so that the hybrid cellular automata method can solve one-dimensional, two-dimensional, and three-dimensional nonlinear dynamic structural optimization problems and any combination thereof in a discrete design space.

(2) A step target internal energy density function is used in the inner loop of the present invention, so that the global optimal solution search capability of the hybrid cellular automata method can be effectively improved.

(3) Cell thickness update rules based on a PID control strategy are used in the inner loop of the present invention, so that the robustness of the hybrid cellular automata method can be effectively improved.

(4) Gradient information does not need to be calculated in the optimization process of the present invention, which has a great advantage in solving complex nonlinear problems where sensitivity information is hard to obtain.

BRIEF DESCRIPTION OF THE DRAWINGS

FIG. 4A is a schematic diagram of a step target internal energy density function when $H_{threshold}=0$ and $V_{threshold}=1$, and FIG. 4B is a schematic diagram of the step target internal energy density function when $H_{threshold}=3$ and $V_{threshold}=1.1$;

FIG. 7A is a diagram illustrating a mass convergence curve of the T-Subdomain HCA #1 algorithm in the present invention, FIG. 7B is a diagram of an iteration process with a maximum intrusion amount of the T-Subdomain HCA #1 algorithm in the present invention, and FIG. 7C is a diagram of an iteration process with a maximum intrusion velocity of the T-Subdomain HCA #1 algorithm in the present invention;

FIG. 8A is a diagram illustrating a mass convergence curve of the T-Subdomain HCA #2 algorithm in the present invention, FIG. 8B is a diagram of an iteration process with a maximum intrusion amount of the T-Subdomain HCA #2 algorithm in the present invention, and FIG. 8C is a diagram of an iteration process with a maximum intrusion velocity of the T-Subdomain HCA #2 algorithm in the present invention;

FIG. 9A is a diagram illustrating a mass convergence curve of the parallel EGO-PCEI algorithm in the present invention, FIG. 9B is a diagram of an iteration process with a maximum intrusion amount of the parallel EGO-PCEI algorithm in the present invention, and FIG. 9C is a diagram of an iteration process with a maximum intrusion velocity of the parallel EGO-PCEI algorithm in the present invention;

FIG. 10A is a comparison diagram of intrusion amount curves at a B-pillar waistline location before and after optimization in the present invention, and FIG. 10B is a comparison diagram of intrusion amount curves at a B-pillar pelvis location before and after optimization in the present invention;

FIG. 11A is a comparison diagram of intrusion velocity curves at a B-pillar waistline location before and after optimization in the present invention, and FIG. 11B is a comparison diagram of intrusion velocity curves at a B-pillar pelvis location before and after optimization in the present invention; FIG. 12A is a diagram of a car body deformation pattern before optimization in the present invention, and FIG. 12B is a diagram of a car body deformation pattern after optimization in the present invention.

DETAILED DESCRIPTION OF THE EMBODIMENTS

The present invention is further illustrated below with reference to the accompanying drawings and specific embodiments, but the protection scope of the present invention is not limited thereto.

A subdomain hybrid cellular automata method for solving car body thickness optimization (Thickness-based Subdomain Hybrid Cellular Automata, T-Subdomain HCA) includes an outer loop and an inner loop: the outer loop is mainly to conduct finite element simulation analysis, calculate an output response and a cell internal energy density, and define an appropriate target mass for the inner loop to achieve minimization of a structural mass under performance constraints; the inner loop is to update a step target internal energy density function according to the target mass and the internal energy density distribution, and then update a cell thickness according to a PID control strategy, so that a current mass of the inner loop converges to the target mass; and finally the cell internal energy density distribution approaches the step target internal energy density function as much as possible.

Figure 1:
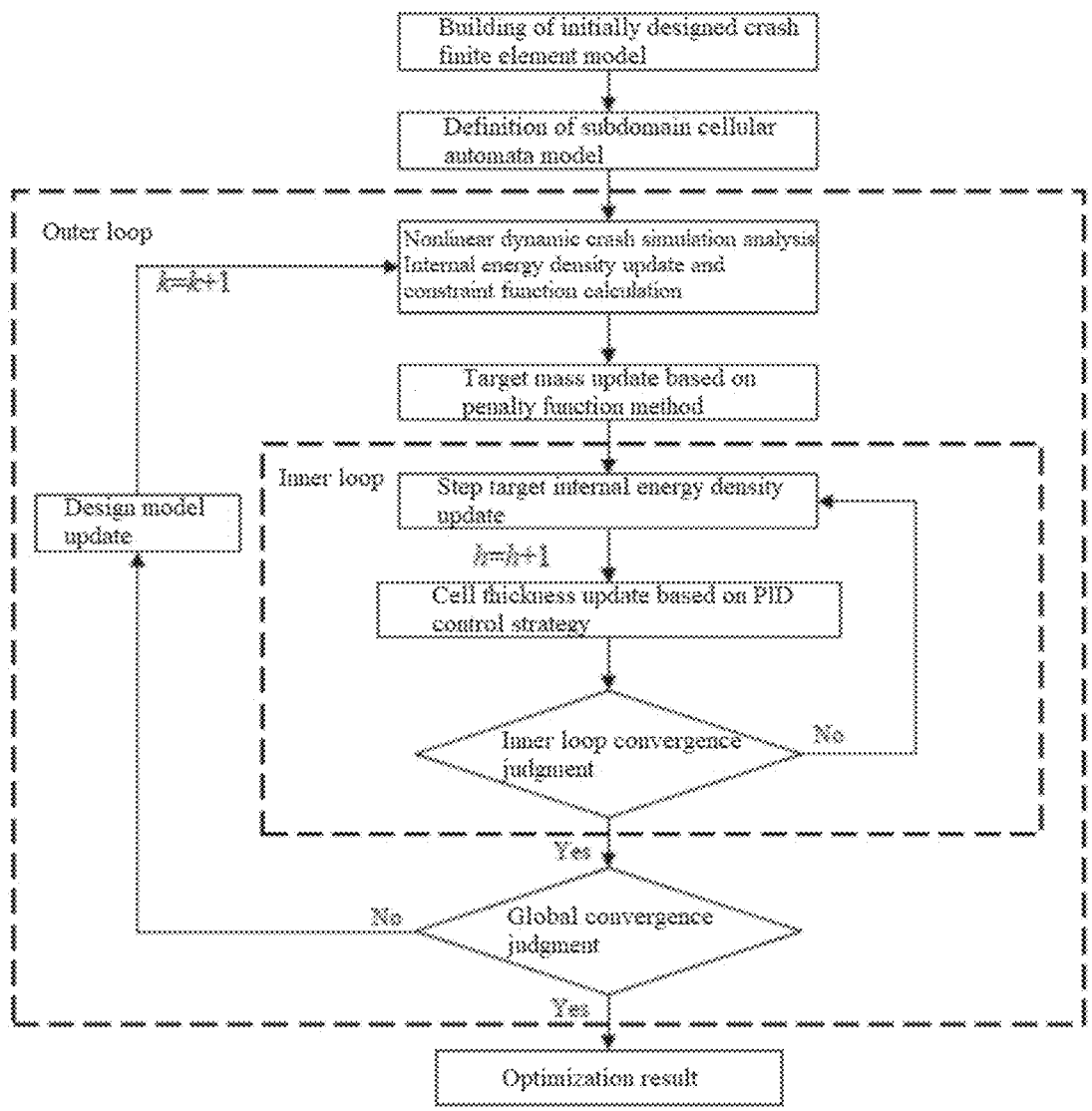
FIG. 1 is a flowchart of a subdomain hybrid cellular automata method for solving car body thickness optimization in the present invention.

As shown in FIG. 1, a subdomain hybrid cellular automata method for solving car body thickness optimization specifically includes the following steps:

S1. an initially designed crash finite element model for thickness optimization of a car body structure is built.

Finite element preprocessing software is used to divide a full-vehicle geometric model into finite element meshes, and then assign attributes and materials thereto, and complete model assembly, connection and boundary condition definition; a full-vehicle crash finite element model is established according to the above steps.

S2. A subdomain cellular automata model for thickness optimization of a car body structure is built, and thickness variables (namely, part thicknesses) and field variables (namely, part internal energy densities) are defined.

Figure 2:
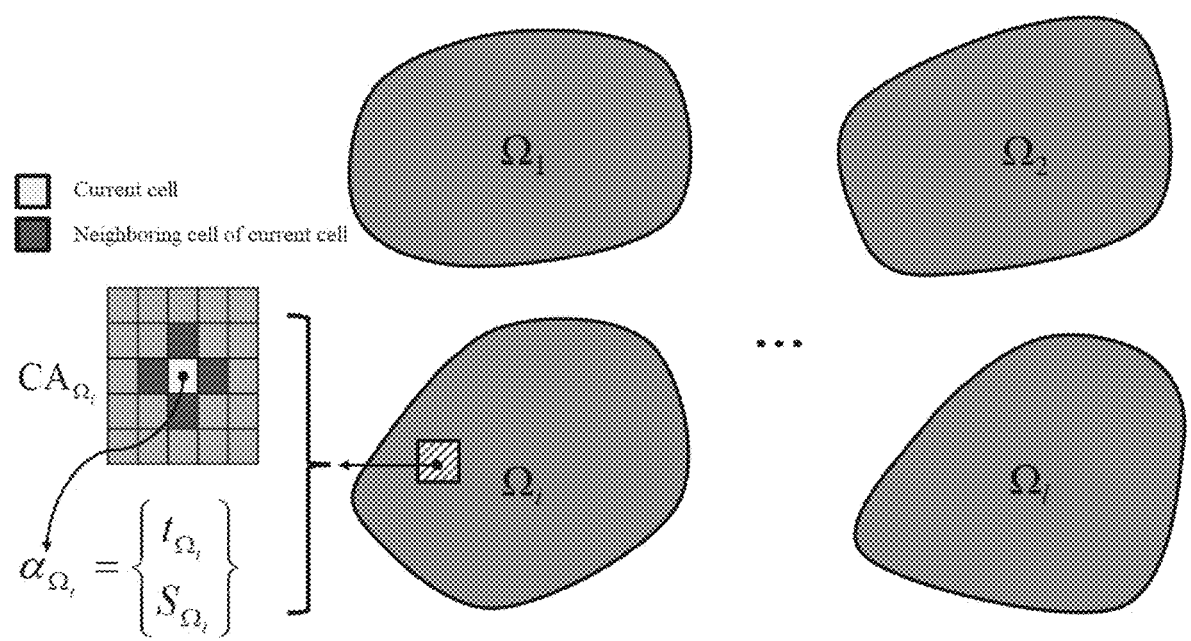
FIG. 2 is a schematic diagram of a subdomain CA model in the present invention.

For a nonlinear dynamic response structural optimization problem with a large scale of design variables in a discrete design space, the concept of "subdomain CA model" is introduced based on a conventional cellular automata model (Cellular Automata, CA), the discrete design space is divided into l subdomains, and a rational cellular automata model is defined for each subdomain, as shown in FIG. 2. Assume that a global design space $\Omega$ consists of l discrete subdomains $\Omega_i$ (i=1, 2,L, l), and each subdomain $\Omega_i$ is described by a cellular automata model $CA_{\Omega_i}$ and a cell state $\alpha_{\Omega_i}$, and the corresponding mathematical expression is:

$$Q(CA_{\Omega_i}, \alpha_{\Omega_i}) = \Omega_1(CA_{\Omega_1}, \alpha_{\Omega_1}) + \Omega_2(CA_{\Omega_2}, \alpha_{\Omega_2}) + L + \Omega_i(CA_{\Omega_i}, \alpha_{\Omega_i}) + L + \Omega_l(CA_{\Omega_l}, \alpha_{\Omega_l}) \quad (1)$$

where $\Omega_i$ is an ith subdomain in the global design space $\Omega$, $CA_{\Omega_i}$ is a cellular automata model (consisting of a current cell and neighboring cells thereof, where the cell type includes one-dimensional cellular automata, two-dimensional cellular automata, and three-dimensional cellular automata) of the ith subdomain, and a. is a cell state of the ith subdomain.

A jth cell state $\alpha_{\Omega_{i,j}}$ in the ith subdomain $\Omega_i$ in FIG. 2 may be represented as:

$$\alpha_{\Omega_{i,j}} = \begin{Bmatrix} t_{\Omega_{i,j}} \\ S_{\Omega_{i,j}} \end{Bmatrix} \qquad (2)$$

in the formula, $t_{\Omega_{i,j}}$ and $S_{\Omega_{i,j}}$ are respectively a thickness variable (for example, a part thickness or a unit thickness) and a field variable (for example, an internal energy density) of a jth cell in the ith subdomain $\Omega_i$. A calculation formula of the field variable $S_{\Omega_{i,j}}$ is:

$$S_\Omega = \frac{1}{\hat{N}_{\Omega_{i,j}}+1} \sum_{n \in N_{\Omega_{i,j}}} \frac{U_{\Omega_{i,n}}}{t_{\Omega_{i,n}} \cdot A_{\Omega_{i,n}}} \qquad (3)$$

in the formula, $U_{\Omega_{i,n}}$ is internal energy of an nth cell in the ith subdomain $Q_i$; $t_{\Omega_{i,n}}$ and $A_{\Omega_{i,n}}$ are respectively a thickness and a surface area of the nth cell in the ith subdomain $\Omega_i$; $N_{\Omega_{i,n}}$ is a set of the neighboring cells of the jth cell in the ith subdomain $\Omega_i$, and the number of the cells in the collection is $\hat{N}_{\Omega_{i,j}}$; $S_{\Omega_{i,n}}$ is a local internal energy density of the jth cell in the ith subdomain $\Omega_i$, namely, the field variable.

Figure 3:
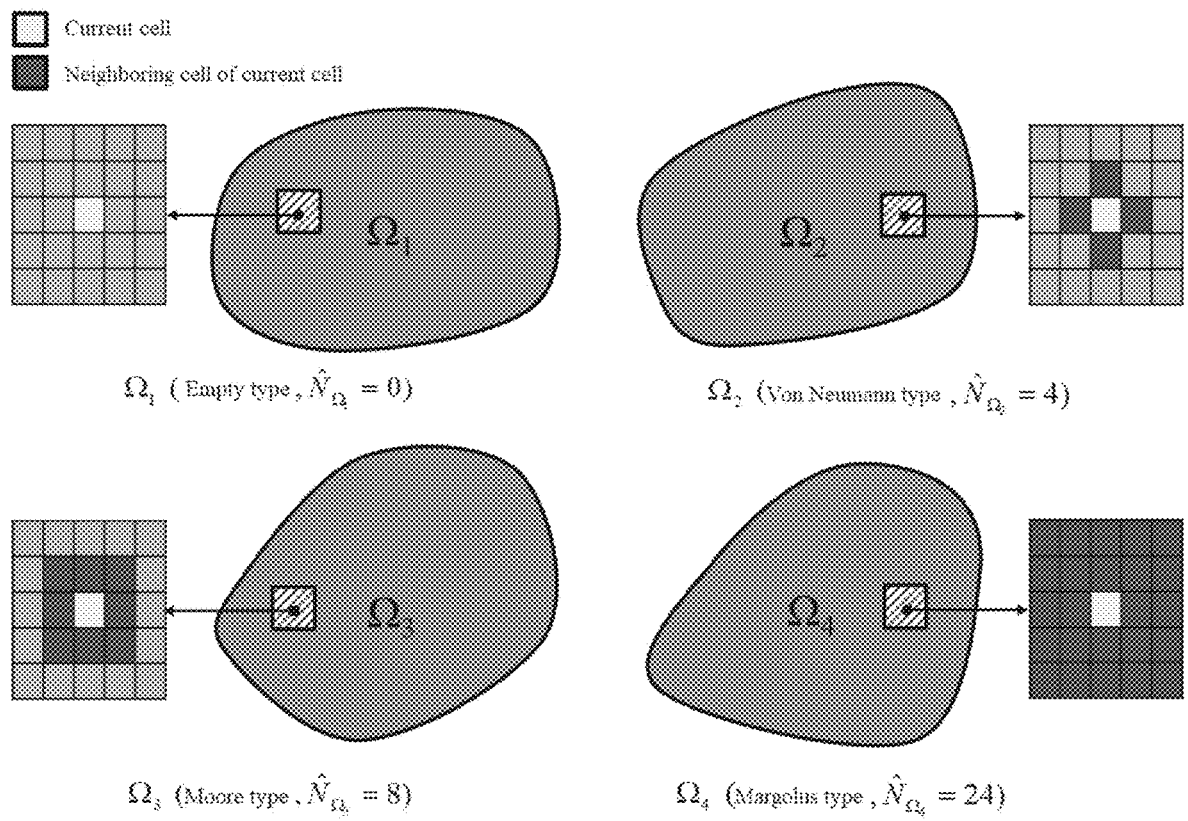
FIG. 3 is a schematic diagram of a two-dimensional subdomain CA model in the present invention.

A specific example of a subdomain CA model defined in a two-dimensional discrete design space is as follows. The discrete design space $\Omega$ in FIG. 3 consists of four subdomains (namely, $\Omega_1$, $\Omega_2$, $\Omega_3$, and $\Omega_4$); a cell type of the subdomain $\Omega_1$ is empty type, and the number of neighboring cells of the current cell is 0; a cell type of the subdomain $\Omega_2$ is Von Neumann type, and the number of neighboring cells of the current cell is 4; a cell type of the subdomain $\Omega_3$ is Moore type, and the number of neighboring cells of the current cell is 8; a cell type of the subdomain $\Omega_4$ is Margolus type, and the number of neighboring cells of the current cell is 24.

S3. The process enters an outer loop, and the following steps are performed:

S3.1. simulation software such as LS DYNA or Radioss or Abaqus or Ansys is invoked to conduct nonlinear dynamic crash simulation analysis, and a cell internal energy density and a constraint function value at a current design point are obtained according to a result of the simulation analysis;

S3.2. a target mass is updated using a penalty function method according to an extent to which the current design point violates a constraint boundary.

A target mass penalty $\Delta M^{*(k)}$ is used to represent the extent to which the current design point violates the constraint boundary in a kth outer loop and then update a target mass $M^{*(k)}$ in the kth outer loop.

The specific expression of the target mass penalty $\Delta M^{*(k)}$ is:

$$\Delta M^{*(k)} = \min(\max(K_q M^{*(0)} \delta^{(k)}, -\Delta M), \Delta M) \qquad (4)$$

$$\delta^{(k)} = \sum_{i=1}^{n_g} \frac{O_i^{(k)} - O_i^*}{O_i^*} \qquad (5)$$

where $n_g$ is the number of constraint functions; $K_q$ represents a proportionality coefficient of the target mass penalty; $O_i^{(k)}$ is a response value of an ith constraint function in the kth outer loop, $O_i^*$ is a constraint boundary of the ith constraint function; $\delta^{(k)}$ represents relative deviation items between $n_g$ constraint functions and constraint boundaries thereof; $M^{*(0)}$ represents an initial total weight of the structure in the design space, and $\Delta M$ represent a maximum penalty of the target mass.

Therefore, an update formula for the target mass $M^{*(k)}$ in the kth outer loop is:

$$M^{*(k)} = \min(M^{*(k-1)} + \Delta M^{*(k)} M^{*(k')}) \qquad (6)$$

where k' represents the location of a most recent feasible solution in the number of iterations in the outer loop; if the iterative outer loop has no feasible solution till now, k'=0.

S4. The process enters an inner loop, and the following steps are performed:

S4.1. a step target internal energy density function (step IED target, SIED*) is constructed, and a target internal energy density is updated.

In order to effectively improve the search capability for a global optimal solution of a T-Subdomain HCA algorithm, the present invention provides a step target internal energy density update function, where the construction process and update rules of the step target internal energy density function are as follows:

S4.1.1. cell sequence number definition: a cell neighborhood relationship in each subdomain is kept unchanged, and according to subscripts i and j of the cell $\Omega_{i,j}$, a sequence number id is defined for the cell using formula (7), that is, id is a function about the subscripts i and j of the cell $\Omega_{i,j}$, and then $S_{id(i,j)}^{(k)} = S_{\Omega_{i,j}}^{(k)}$;

$$id(i,j) = \hat{N}_{\Omega_{i-1}} * (i-1) + j, j \in [1, N_{\Omega_i}], N_{\Omega_0} = 0 \qquad (7)$$

where $\hat{N}_{\Omega_{i-1}}$ is the number of cells in an (i−1)th subdomain.

S4.1.2. All cells are traversed, and a difference between internal energy densities $S_{id}^{(k)}$ of all cells and an average $\overline{S}^{(k)}$ thereof in the kth outer loop is calculated:

$$\Delta S_{id}^{(k)} = S_{id}^{(k)} - \overline{S}^{(k)} \qquad (8)$$

where $$\overline{S}^{(k)} = \frac{1}{\sum_{i=1}^{l} \hat{N}_{\Omega_i}} \sum_{i=1}^{l} \sum_{j=1}^{\hat{N}_{\Omega_i}} S_{\Omega_{i,j}}^{(k)}$$

is the average of the internal energy densities of all the cells in the kth outer loop.

S4.1.3. "Step points" and "step intervals" are determined.

All the cells are traversed, and it is judged whether formula (9) is established. If formula (9) is established, a subscript id of $\Delta S_{id}^{(k)}$ is defined as a "step point" and denoted as $id_i$. Assuming that m "step points" are determined according to formula (9), the m "step points" can form m+1 "step intervals" denoted as $[id_{i-1}, id_i]$, where i=1, ..., m+1, $id_0$ $$id_{m+1} = \sum_{i=1}^{l} \hat{N}_{\Omega_i}.$$

$$\Delta S_{id}^{(k)} * \Delta S_{id+1}^{(k)} < 0 \qquad (9)$$

S4.1.4. The "step points" and "step intervals" are updated.

Let a width threshold of the "step interval" be $H_{threshold}$, all "step intervals" are traversed, and it is judged whether formula (10) is established. If formula (10) is established (that is, the "step interval" $[id_{i-1}, id_i]$ has a small width), the "step points" are deleted and the "step intervals" are updated in the following manner: when i=1, a "step point" $id_1$ is deleted, the "step interval" is updated from $[id_0, id_1]$ to $[id_0, id_2]$; when i>1, a "step point" $id_{i-1}$ is deleted, and the "step interval" is updated from $[id_{i-1}, id_i]$ to $[id_{i-2}, id_i]$. If formula (10) is not established, the original "step points" and "step intervals" are retained. Assuming that the number of the updated "step points" is m', the number of the updated "step intervals" is m'+1.

$$id_{i+1} - id_i + 1 < H_{threshold} \quad (10)$$

S4.1.5. The step target internal energy density function is constructed, and the equation is as follows:

$$S^{*(h,k)} = \begin{cases} S_1^{*(h,k)}, & 1 \leq id \leq id_1 \\ S_2^{*(h,k)}, & id_1 < id \leq id_2 \\ \ldots \\ S_i^{*(h,k)}, & id_{i-1} < id \leq id_i \\ \ldots \\ S_{m'}^{*(h,k)}, & id_{m'-1} < id \leq id_{m'} \\ S_{m'+1}^{*(h,k)}, & id_{m'} < id \leq \sum_{i=1}^{I} \hat{N}_{\Omega_i} \end{cases} \quad (11)$$

where $S_i^{*(h,k)}$ is a target internal energy density in the "step interval" $[id_{i-1}, id_i]$ in the kth outer loop and an hth inner loop.

S4.1.6. The step target internal energy density function is updated: in order to achieve the specified target mass in the outer loop, a target internal energy density of each "step interval" in the inner loop is updated according to formula (12).

$$S_i^{*(h+1,k)} = S_i^{*(h,k)} \frac{M^{(h,k)}}{M^{*(k)}} \quad (12)$$

where $M^{*(k)}$ represents the target mass obtained by update in the kth outer loop; $M^{(h,k)}$ represents a current mass obtained by thickness update in the kth outer loop and the hth inner loop; an initial target internal energy density $S_i^{*(0,k)}$ of each "step interval" each time the process enters the inner loop is obtained from formula (13):

$$S_i^{*(0,k)} = \begin{cases} \overline{S}_i^{(k)}, & \overline{S}_i^{(k)} \geq \overline{S}^{(k)} * V_{threshold} \\ \overline{S}^{(k)}, & \overline{S}_i^{(k)} < \overline{S}^{(k)} * V_{threshold} \end{cases} \quad (13)$$

where $V_{threshold}$ is a target internal energy density threshold coefficient in the "step interval"; $\overline{S}^{(k)}$ is the average of the internal energy densities of all the cells in the kth outer loop; $\overline{S}_i^{(k)}$, is an average of internal energy densities of all cells in the "step interval" $[id_{i-1}, id_i]$ (i=1, ..., m+1), as shown in formula (14).

$$\overline{S}_i^{(k)} = \frac{1}{id_{i+1} - id_i + 1} \sum_{i'=id_i}^{id_{i+1}} S_{i'}^{(k)} \quad (14)$$

Figure 4A:
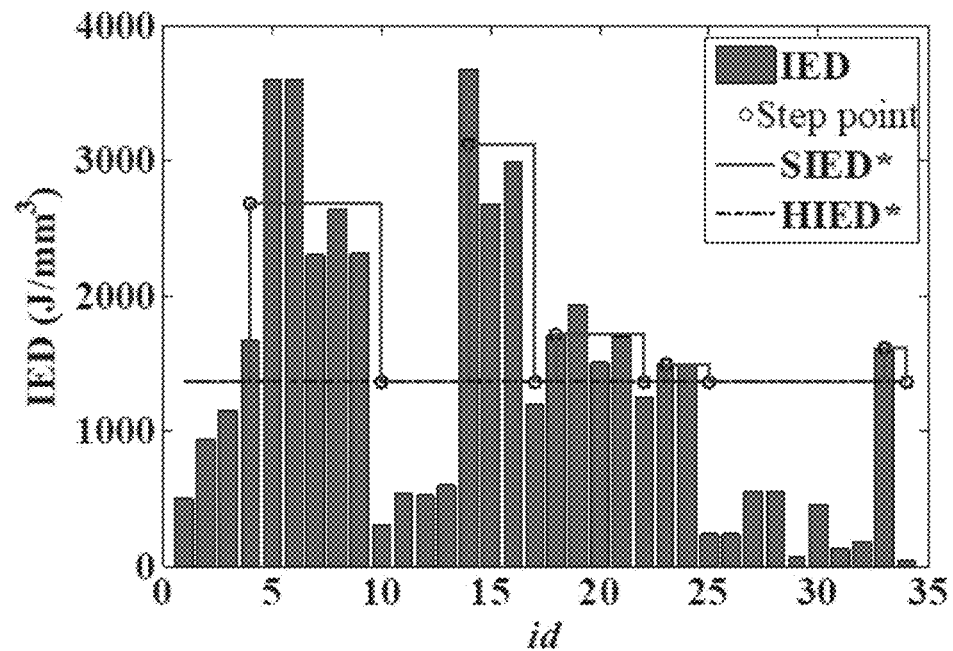
FIGS. 4A-4B are schematic diagrams of a step target internal energy density function in the present invention, where
Figure 4B:
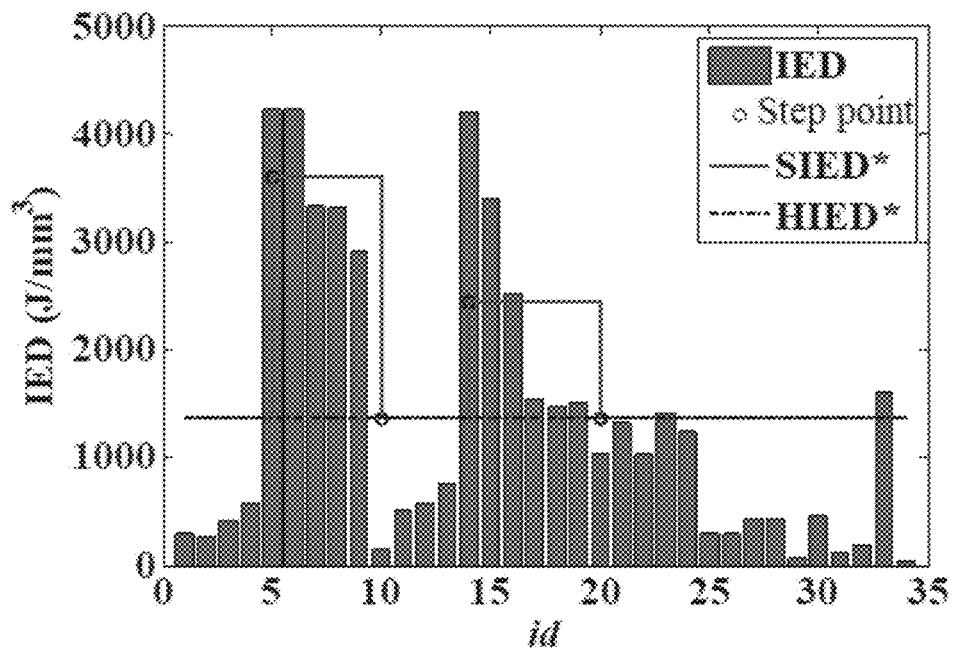

When $H_{threshold}=0$ and $V_{threshold}=1$, a schematic diagram of the step target internal energy density function constructed according to the above step is shown in FIG. 4A; when $H_{threshold}=3$ and $V_{threshold}=1.1$, a schematic diagram of the step target internal energy density function constructed according to the above step is shown in FIG. 4B; in the figures, HIED* is a horizontal IED target, a horizontal target internal energy density function step IED target, SIED*.

S4.2. a cell thickness is updated using cell thickness update rules based on a PID control strategy.

In order to effectively improve the robustness of the T-Subdomain HCA algorithm, the present invention provides cell thickness update rules based on a PID control strategy. The cell thickness update formula is:

$$t_{\Omega_{i,j}}^{(h+1,k)} = \begin{cases} t_{\Omega_{i,j}}^{min}, & t_{\Omega_{i,j}}^{(h,k)} + \Delta t_{\Omega_{i,j}}^{(h,k)} < t_{\Omega_{i,j}}^{min} \\ t_{\Omega_{i,j}}^{(h,k)} + \Delta t_{\Omega_{i,j}}^{(h,k)}, & t_{\Omega_{i,j}}^{min} \leq t_{\Omega_{i,j}}^{(h,k)} + \Delta t_{\Omega_{i,j}}^{(h,k)} \leq t_{\Omega_{i,j}}^{max} \\ t_{\Omega_{i,j}}^{max}, & t_{\Omega_{i,j}}^{(h,k)} + \Delta t_{\Omega_{i,j}}^{(h,k)} > t_{\Omega_{i,j}}^{max} \end{cases} \quad (15)$$

in the formula, $t_{\Omega_{i,j}}^{(h,k)}$ is a cell thickness of the jth cell in the ith subdomain $\Omega_i$ in the kth outer loop and the hth inner loop; $t_{\Omega_{i,j}}^{(h+1,k)}$ is a cell thickness of the jth cell in the ith subdomain $\Omega_i$ in the kth outer loop and an (h+1)th inner loop; $t_{\Omega_{i,j}}^{min}$ and $t_{\Omega_{i,j}}^{max}$ are respectively a minimum and a maximum of the cell thickness of the jth cell in the ith subdomain $Q_i$; $\Delta t_{\Omega_{i,j}}^{(h,k)}$ is a variation of the cell thickness of the jth cell in the ith subdomain $\Omega_i$ in the kth outer loop and the hth inner loop, and has an expression as follows:

$$\Delta t_{\Omega_{i,j}}^{(h,k)} = (t_{\Omega_{i,j}}^{max} - t_{\Omega_{i,j}}^{min}) f(e_{\Omega_{i,j}}^{(h,k)}) \quad (16)$$

where $f(et_{\Omega_{i,j}}^{(h,k)})$ is a PID control function for cell thickness update, and has an expression as follows:

$$f(e_{\Omega_{i,j}}^{(h,k)}) = K_p e_{\Omega_{i,j}}^{(h,k)} + K_i \left[ e_{\Omega_{i,j}}^{(h,k)} + \sum_{\tau=1}^{k-1} e_{\Omega_{i,j}}^{(\tau)} \right] + K_d \times \left[ e_{\Omega_{i,j}}^{(h,k)} - e_{\Omega_{i,j}}^{(k-1)} \right] \quad (17)$$

where $K_p$ is a proportional control coefficient, $K_i$ is an integral control coefficient, $K_d$ is a differential control coefficient, $et_{\Omega_{i,j}}^{(\tau)}$ represents a relative deviation item of a τth outer loop, $et_{\Omega_{i,j}}^{(k-1)}$ represents a relative deviation item of a (k−1)th outer loop, and $et_{\Omega_{i,j}}^{(h,k)}$ represents a relative deviation item between an internal energy density $S_{\Omega_{i,j}}^{(k)}$ of the current cell and a target internal energy density $S_{m'}^{*(h,k)}$, and has a calculation formula as follows:

$$e_{\Omega_{i,j}}^{(h,k)} = \frac{S_{\Omega_{i,j}}^{(k)} - S_{m'}^{*(h,k)}}{S_{m'}^{*(h,k)}} \quad (18)$$

S4.3. it is judged whether the inner loop converges: if a convergence condition for the inner loop is not satisfied, the process returns to S4.1; if the convergence condition for the inner loop is satisfied, the process exits the inner loop and S5 is performed.

The convergence condition for the inner loop is:

$$|M^{(h,k)} - M^{*(k)}| < \varepsilon_1 \text{ or } k_1 \geq k_{1max} \quad (19)$$

in the formula, $\varepsilon_1$ is a mass convergence factor, $k_1$ represents the number of iterations in the inner loop, and $k_{1max}$ represents the maximum number of iterations in the inner loop.

S5: it is judged whether the outer loop converges: if global convergence conditions for the outer loop are not satisfied, the cell thickness is updated using the inner loop and the process returns to S3; if the global convergence conditions are reached, the T-Subdomain HCA algorithm converges and an optimization result is output.

The T-Subdomain HCA algorithm includes the following three convergence conditions, and the algorithm will converge as long as any one condition is satisfied:

(1) When the number of iterations k (namely, the number of finite element simulation analyses) in the outer loop exceeds a predefined maximum number of iterations $k_{max}$, the T-Subdomain HCA algorithm ends iteration.

(2) Let $p_f$ represent the number of iterations where infeasible solutions continuously appear, wherein an initial value of $p_f$ is 0, and let $p^*_f$ represent the maximum number of iterations where infeasible solutions continuously appear. In the iteration process, if the current design point is an infeasible solution, $p_f=p_f+1$; if the current design point is a feasible solution, $p_f=0$. When $p_f>p^*_f$, the T-Subdomain HCA algorithm ends iteration.

(3) When the variation of design variables is very small, namely, satisfies $$\sum_{i=1}^{N} |t^k_{\Omega_{i,j}} - t^{k-1}_{\Omega_{i,j}}| < \varepsilon_2,$$

the T-Subdomain HCA algorithm ends iteration; in the formula, N represents the total number of cells, and $\varepsilon_2$ represents a global convergence factor.

Embodiment

Figure 5:
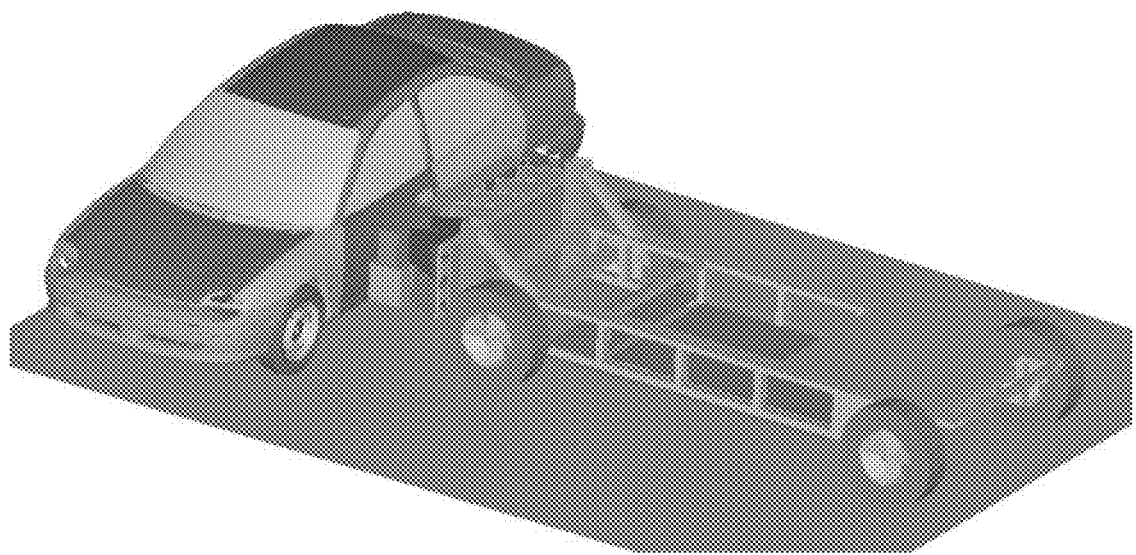
FIG. 5 is a schematic diagram of a full-vehicle side crash finite element model in the present invention.

Crashworthiness optimization design of a car body beam framework is used as an example below, and the thickness of the car body framework is optimized using T-Subdomain HCA algorithm under the vehicle side impact loading to verify the convergence and efficiency of the T-Subdomain HCA algorithm. The full-vehicle crash finite element (FE) model used in this embodiment has a total weight of 1346 kg, and includes a total of 276838 elements and 284961 nodes. The body in white is constructed mainly using shell elements, and an engine, a gearbox, a suspension system, etc. are established mainly using solid elements. In a full-vehicle side impact FE model, the type of material used for deformable structures is piecewise linear elastoplastic material, and the type of material used by non-deformable structures is rigid material. Contact algorithms used by the full-vehicle FE model mainly include single surface, automatic surface-to-surface, and point-to-surface, and a contact algorithm used for a mobile deformable barrier and a target vehicle is automatic surface-to-surface. According to the requirements of the regulations in "The protection of the occupants in the event of a lateral collision" (GB 20071-2006), a mobile deformable barrier has a weight of 950 kg and perpendicularly hits a target vehicle at an initial velocity of 50 km/h, as shown in FIG. 5.

In vehicle side impact loading, B-pillar, sill, front and rear doors, and roof middle crossbeam have large deformation and are main energy absorbing structures; A-pillar, roof rail, seat crossbeam, and roof crossbeam are mainly used for transferring impact load. Therefore, 34 part thicknesses of 14 assemblies such as the A-pillar, B-pillar, sill, roof rail, front and rear doors, rear side member, seat crossbeam, and roof crossbeam are defined as design variables.

Figure 6:
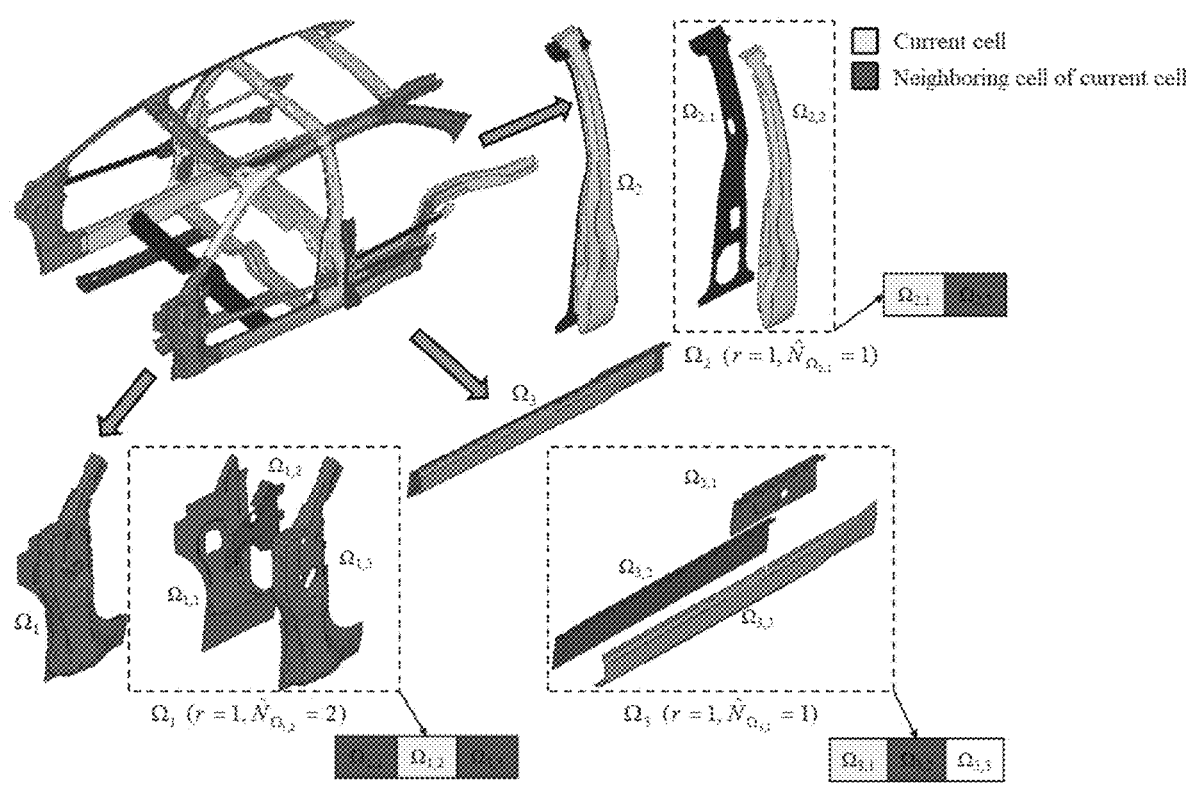
FIG. 6 is a schematic diagram of a subdomain CA model of a car body beam framework in the present invention.

Defined steps of a subdomain CA model for the car body structure are provided below:

Step (1). subdomain division: according to topological connection characteristics of a car body structure, the design domain is divided into several mutually independent subdomains denoted as $\Omega_i$; for example, in FIG. 6, the assemblies such as the A-pillar, B-pillar, and sill, are respectively defined as a subdomain $\Omega_1$, a subdomain $\Omega_2$, and a subdomain $\Omega_3$.

Step (2). cell definition: each component is defined as a cell (denoted as $\Omega_{i,j}$) in the subdomain $\Omega_i$ (i=1, 2,L, l), where a subscript i of $\Omega_{i,j}$ represents a sequence number of an ith subdomain, and a subscript j represents the location of a current cell in the ith subdomain; in each subdomain $\Omega_i$ (i=1, 2,L, l), the subscripts j of the cells are sequentially numbered from small to large according to principles of from inside to outside, from front to back, and from bottom to top.

Step (3). cell state variable definition: design variables (for example, part thicknesses) and field variables (for example, internal energy densities) are sequentially defined for the cells.

Step (4). cell neighborhood definition: all subdomains $\Omega_i$ (i=1,2,L, l) are traversed, for cells in the same subdomain, neighboring cells of a current cell are determined according to magnitudes of subscripts j, and a set of the neighboring cells of the current cell is referred to as a neighborhood. For example, three subdomains are defined in FIG. 6, let the cell radius equal to 1, and all cells within the cell radius of r from the center which is the current cell are referred to as neighboring cells of the current cell; the number $\hat{N}_{\Omega_{1,2}}$ of neighboring cells of the current cell $\Omega_{1,2}$ in the subdomain $\Omega_1$ is 2, the number $\hat{N}_{\Omega_{2,2}}$ of neighboring cells of the current cell $\Omega_{2,1}$ in the subdomain $\chi_2$ is 1, and the number $\hat{N}_{\Omega_{3,2}}$ of neighboring cells of the current cell $\Omega_{3,1}$ in the subdomain $\Omega_3$ is 1.

According to the above four steps, a total of 14 subdomains and a total of 34 thickness variables are defined for the car bodystructure, as shown in FIG. 6 and Table 1.

TABLE 1

Design variable table of car body structure under vehicle side impact loading

| Subdomain | | | | Design variable | | | |
|---|---|---|---|---|---|---|---|
| Assembly name | Symbol | CA Part name | Symbol | Symbol | Initial value | Lower limit | Upper limit |
| A-pillar | $\Omega_1$ | A-pillar inner panel | $\Omega_{1,1}$ | $x_1$ | 1.9 | 1.2 | 3.0 |
| | | A-pillar reinforcement#1 | $\Omega_{1,2}$ | $x_2$ | 1.9 | 1.0 | 3.0 |
| | | A-pillar reinforcement#2 | $\Omega_{1,3}$ | $x_3$ | 2.6 | 1.0 | 3.0 |
| | | A-pillar outer panel | $\Omega_{1,4}$ | $x_4$ | 1.4 | 1.2 | 3.0 |
| B-pillar | $\Omega_2$ | B-pillar inner panel | $\Omega_{2,1}$ | $x_5$ | 1.8 | 1.4 | 3.0 |
| | | B-pillar reinforcement | $\Omega_{2,2}$ | $x_6$ | 2.0 | 1.4 | 3.0 |
| Sill | $\Omega_3$ | Sill inner panel#1 | $\Omega_{3,1}$ | $x_7$ | 1.6 | 1.2 | 3.0 |
| | | Sill inner panel#2 | $\Omega_{3,2}$ | $x_8$ | 1.8 | 1.2 | 3.0 |
| | | Sill reinforcement | $\Omega_{3,3}$ | $x_9$ | 2.0 | 1.2 | 3.0 |
| Roof rail | $\Omega_4$ | A-pillar roof rail#1 | $\Omega_{4,1}$ | $x_{10}$ | 1.6 | 1.0 | 3.0 |
| | | A-pillar roof rail#2 | $\Omega_{4,2}$ | $x_{11}$ | 1.6 | 1.0 | 3.0 |
| | | B-pillar roof rail | $\Omega_{4,3}$ | $x_{12}$ | 1.6 | 1.0 | 3.0 |
| | | C-pillar roof rail | $\Omega_{4,4}$ | $x_{13}$ | 1.6 | 1.0 | 3.0 |
| Front door | $\Omega_5$ | Front door anti-collision beam mounting panel#1 | $\Omega_{5,1}$ | $x_{14}$ | 1.9 | 1.0 | 3.0 |
| | | Front door anti-collision beam | $\Omega_{5,2}$ | $x_{15}$ | 2.6 | 1.0 | 3.0 |
| | | Front door anti-collision beam mounting panel#2 | $\Omega_{5,3}$ | $x_{16}$ | 1.9 | 1.0 | 3.0 |
| | | Front door inner panel reinforcement | $\Omega_{5,4}$ | $x_{17}$ | 1.5 | 1.0 | 3.0 |
| Rear door | $\Omega_6$ | Rear door anti-collision beam mounting panel 1 | $\Omega_{6,1}$ | $x_{18}$ | 1.3 | 1.0 | 3.0 |
| | | Rear door anti-collision beam 1 | $\Omega_{6,2}$ | $x_{19}$ | 2.0 | 1.0 | 3.0 |
| | | Rear door anti-collision beam mounting panel 2 | $\Omega_{6,3}$ | $x_{20}$ | 1.8 | 1.0 | 3.0 |
| | | Rear door inner panel reinforcement | $\Omega_{6,4}$ | $x_{21}$ | 2.6 | 1.0 | 3.0 |
| | | Rear door anti-collision beam mounting panel 3 | $\Omega_{6,5}$ | $x_{22}$ | 1.8 | 1.0 | 3.0 |
| | | Rear door anti-collision beam 2 | $\Omega_{6,6}$ | $x_{23}$ | 2.6 | 1.0 | 3.0 |
| | | Rear door anti-collision beam mounting panel 4 | $\Omega_{6,7}$ | $x_{24}$ | 1.3 | 1.0 | 3.0 |
| Rear side member | $\Omega_7$ | Rear side member inner panel | $\Omega_{7,1}$ | $x_{25}$ | 2.5 | 1.4 | 3.0 |
| | | Rear side member outer panel | $\Omega_{7,2}$ | $x_{26}$ | 2.5 | 1.4 | 3.0 |
| Seat crossbeam | $\Omega_8$ | Seat crossbeam lining panel | $\Omega_{8,1}$ | $x_{27}$ | 2.0 | 1.0 | 3.0 |
| | | Seat crossbeam | $\Omega_{8,2}$ | $x_{28}$ | 1.5 | 1.2 | 3.0 |
| Front side member rear section | $\Omega_9$ | Front side member rear section | $\Omega_{9,1}$ | $x_{29}$ | 1.2 | 1.0 | 3.0 |
| Seat rear crossbeam | $\Omega_{10}$ | Seat rear crossbeam | $\Omega_{10,1}$ | $x_{30}$ | 2.0 | 1.2 | 3.0 |
| Rear floor front crossbeam | $\Omega_{11}$ | Rear floor front crossbeam | $\Omega_{11,1}$ | $x_{31}$ | 1.4 | 1.2 | 3.0 |
| Roof front crossbeam | $\Omega_{12}$ | Roof front crossbeam | $\Omega_{12,1}$ | $x_{32}$ | 1.4 | 1.0 | 3.0 |
| Roof middle crossbeam | $\Omega_{13}$ | Roof middle crossbeam | $\Omega_{13,1}$ | $x_{33}$ | 2.0 | 1.0 | 3.0 |

TABLE 1-continued

Design variable table of car body structure under vehicle side impact loading

| Subdomain | | | | Design variable | | | |
|---|---|---|---|---|---|---|---|
| Assembly name | Symbol | CA Part name | Symbol | Symbol | Initial value | Lower limit | Upper limit |
| Roof rear crossbeam | $\Omega_{14}$ | Roof rear crossbeam | $\Omega_{14,1}$ | $x_{34}$ | 1.4 | 1.0 | 3.0 |

Maximum intrusion amount and maximum intrusion velocity at B-pillar waistline location and maximum intrusion amount and maximum intrusion velocity at B-pillar pelvis location are respectively selected as crashworthiness indexes and output responses of the full-vehicle side crash, which are respectively denoted as $d_1(x)$, $v_1(x)$, $d_2(x)$, and $v_2(x)$.

In this embodiment, minimization of the total weight of the 34 parts in Table 1 is used as an objective function, and the maximum intrusion amount and the maximum intrusion velocity at the B-pillar waistline location and pelvis location are used as constraint functions. The initial total weight of the 34 parts is 108.30 kg, initial maximum intrusion amounts are respectively 252.80 mm and 234.40 mm, and initial maximum intrusion velocities are respectively 9.00 m/s and 8.30 m/s. It is obvious that the initial full-vehicle crash model cannot meet the requirements of the regulations in "The protection of the occupants in the event of a lateral collision" (GB 20071-2006). In order to meet the requirements of the regulations, the maximum intrusion amount and the maximum intrusion velocity should be less than or equal to 180 mm and 8 m/s respectively, and corresponding optimization equations are:

$$\begin{cases} \min\ M(x) \\ \text{s.t.}\ d_1(x) \leq 180 \\ \phantom{\text{s.t.}\ }d_2(x) \leq 180 \\ \phantom{\text{s.t.}\ }v_1(x) \leq 8 \\ \phantom{\text{s.t.}\ }v_2(x) \leq 8 \\ \phantom{\text{s.t.}\ }x^L \leq x \leq x^U,\ \ x = (x_1, x_2, \ldots, x_{33}, x_{34})^T \end{cases} \quad (20)$$

where $x^L$ is lower boundary of design variable, and $x^U$ is upper boundary of design variable.

Usually, a horizontal target internal energy density function (horizontal IED target, HIED*) (shown in formula (21)) is calculated in each iteration of an inner loop of a conventional HCA method, and then a cell thickness is updated according to a certain control strategy, so that a current mass of the inner loop converges to a target mass.

$$S^{*(h+1,k)} = S^{*(h,k)} \frac{M^{(h,k)}}{M^{*(k)}} \quad (21)$$

in the formula, $M^{*(k)}$ represents a target mass obtained by updating in the kth outer loop, $M^{(h,k)}$ represents a current mass obtained in the kth outer loop and the hth inner loop, $S^{*(h,k)}$ is a horizontal target internal energy density in the kth outer loop and the hth inner loop, and $S^{*(h+1,k)}$ represents a horizontal target internal energy density in the kth outer loop and the (h+1)th inner loop.

In this embodiment, a T-Subdomain HCA algorithm in which a horizontal target internal energy density function used in inner loop is referred to as "T-Subdomain HCA #1" algorithm, and the T-Subdomain HCA algorithm in which a step target internal energy density function used in inner loop is referred to as "T-Subdomain HCA #2" algorithm. In order to verify the convergence and efficiency of the T-Subdomain HCA #2 algorithm in the present invention, the T-Subdomain HCA #1 and T-Subdomain HCA #2 algorithms and a parallel EGO algorithm based on a pseudo CEI criterion (Parallel Efficient Global Optimization based on pseudo constrained expected improvement, "parallel EGO-PCEI" for short) are separately used for solving the optimization equation (20), and optimization results and the numbers of finite element analyses of the aforementioned three methods are compared. For the parameter setting of the T-Subdomain HCA #1 and T-Subdomain HCA #2 algorithms, see Table 2 for details. For the parameter setting of the parallel EGO-PCEI algorithm, see Table 3 for details.

TABLE 2

Parameter setting of T-Subdomain HCA algorithm

| Parameter name | Symbol | T-Subdomain HCA#1 | T-Subdomain HCA#2 |
|---|---|---|---|
| Cell number | N | 34 | 34 |
| Subdomain number | l | 14 | 14 |
| Cell radius | r | 1 | 1 |
| Width threshold of "step interval" | $H_{threshold}$ | — | 4 |
| Target internal energy density threshold coefficient in "step interval" | $V_{threshold}$ | — | 1.1 |
| Proportional control coefficient of cell thickness variation | $K_p$ | 0.03 | 0.03 |
| Integral control coefficient of cell thickness variation | $K_i$ | 0.0001 | 0.0001 |
| Differential control coefficient of cell thickness variation | $K_d$ | 0.0001 | 0.0001 |
| Proportionality coefficient of target mass penalty | $K_q$ | 0.1 | 0.1 |
| Maximum penalty of target mass | $\Delta M$ | 4 kg | 4 kg |
| Maximum number of iterations where infeasible solutions continuously appear | $P^*_f$ | 8 | 8 |
| Maximum number of iterations in inner loop | $k_{lmax}$ | 2000 | 2000 |
| Maximum number of iterations in outer loop | $k_{max}$ | 50 | 50 |
| Convergence coefficient of inner loop | $\varepsilon_1$ | 0.001 | 0.001 |
| Global convergence coefficient | $\varepsilon_2$ | 0.001 | 0.001 |

TABLE 3

Parameter setting of parallel EGO-PCEI algorithm

| Parameter name | Symbol | Parameter value |
|---|---|---|
| Number of design variables | $N_v$ | 34 |
| Number of initial samples | $N_{initial}$ | 4 |
| Number of parallel calculations | $N_{parallel}$ | 4 |
| Maximum number of finite element analyses | $Max_{FEA}$ | 300 |

Figure 7A:
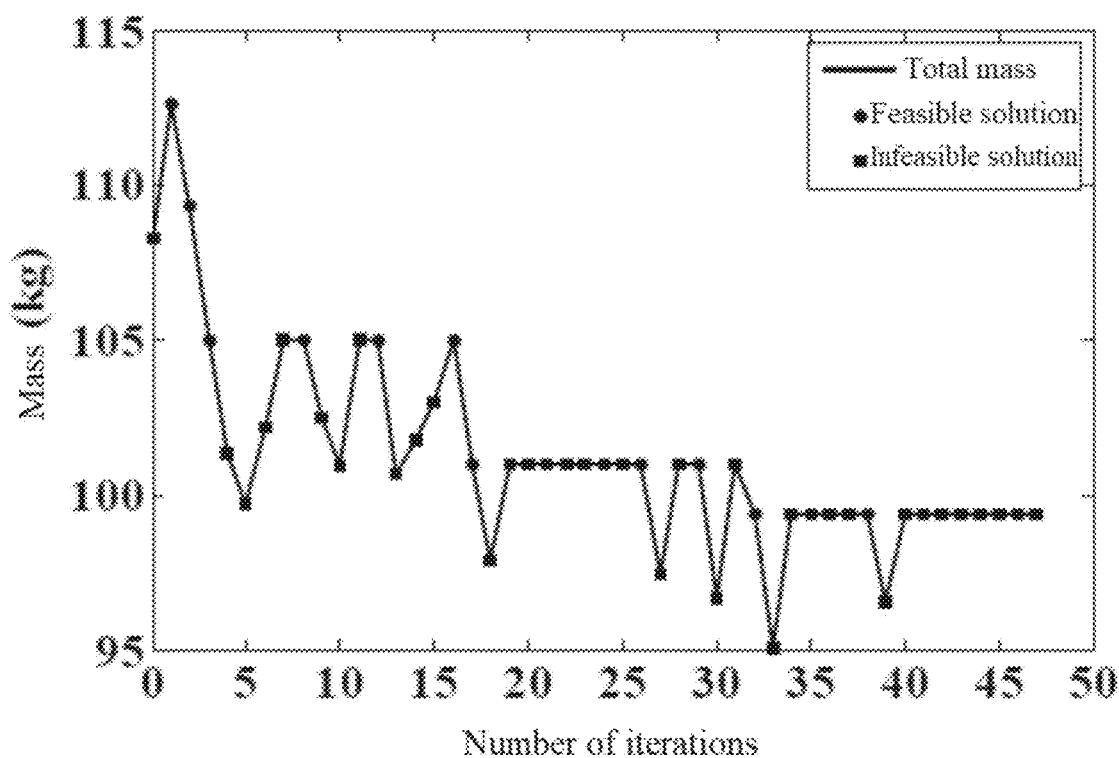
FIGS. 7A-7C are curve diagrams of iteration processes of a T-Subdomain HCA #1 algorithm in the present invention, where
Figure 7B:
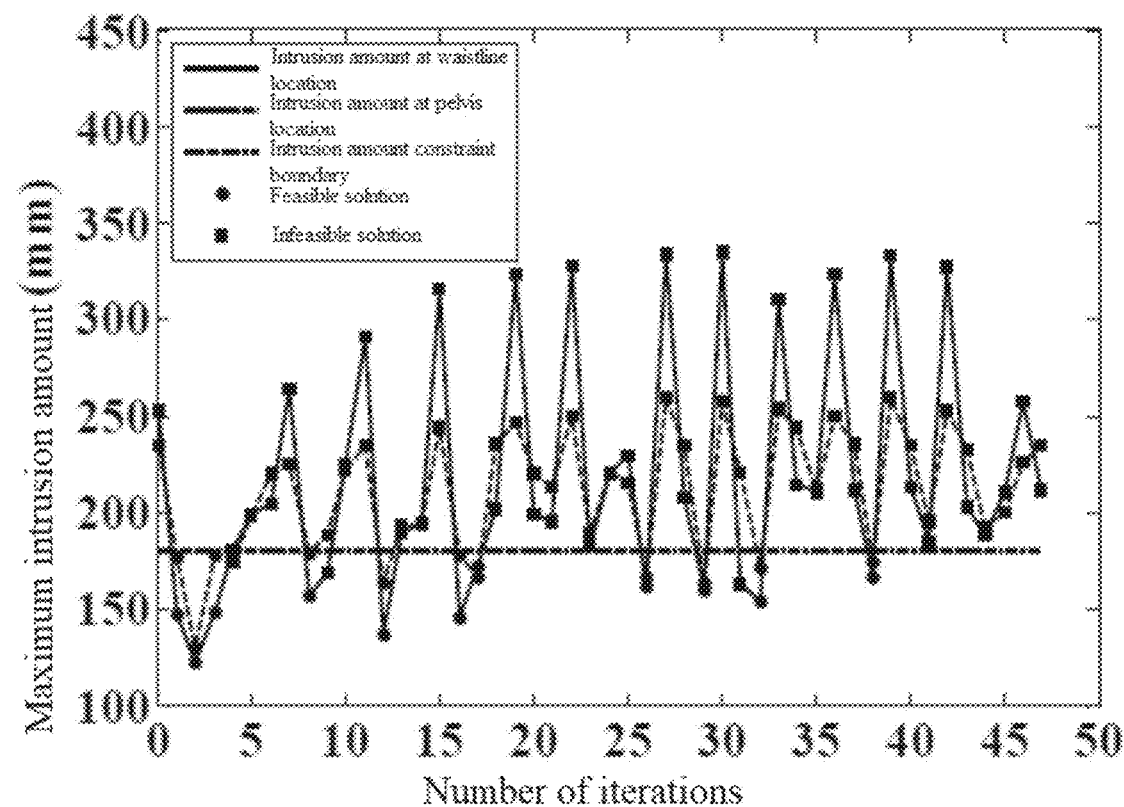
Figure 7C:
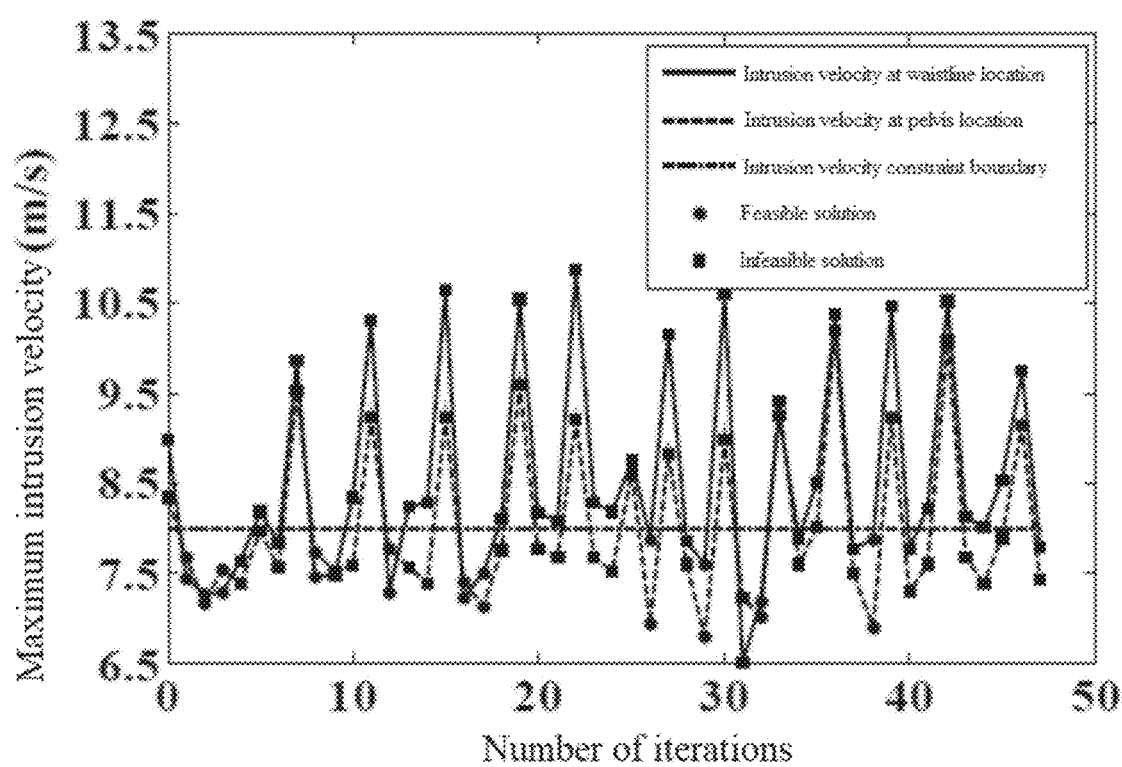
Figure 8A:
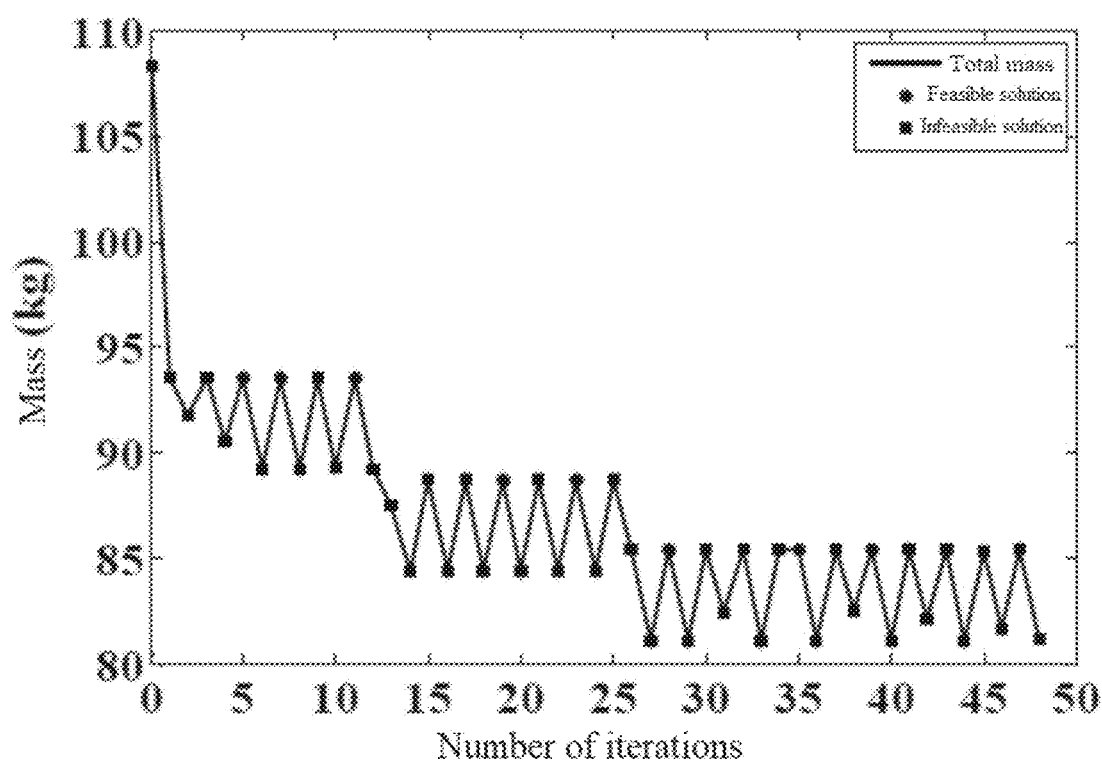
FIGS. 8A-8C are curve diagrams of iteration processes of a T-Subdomain HCA #2 algorithm in the present invention, where
Figure 8B:
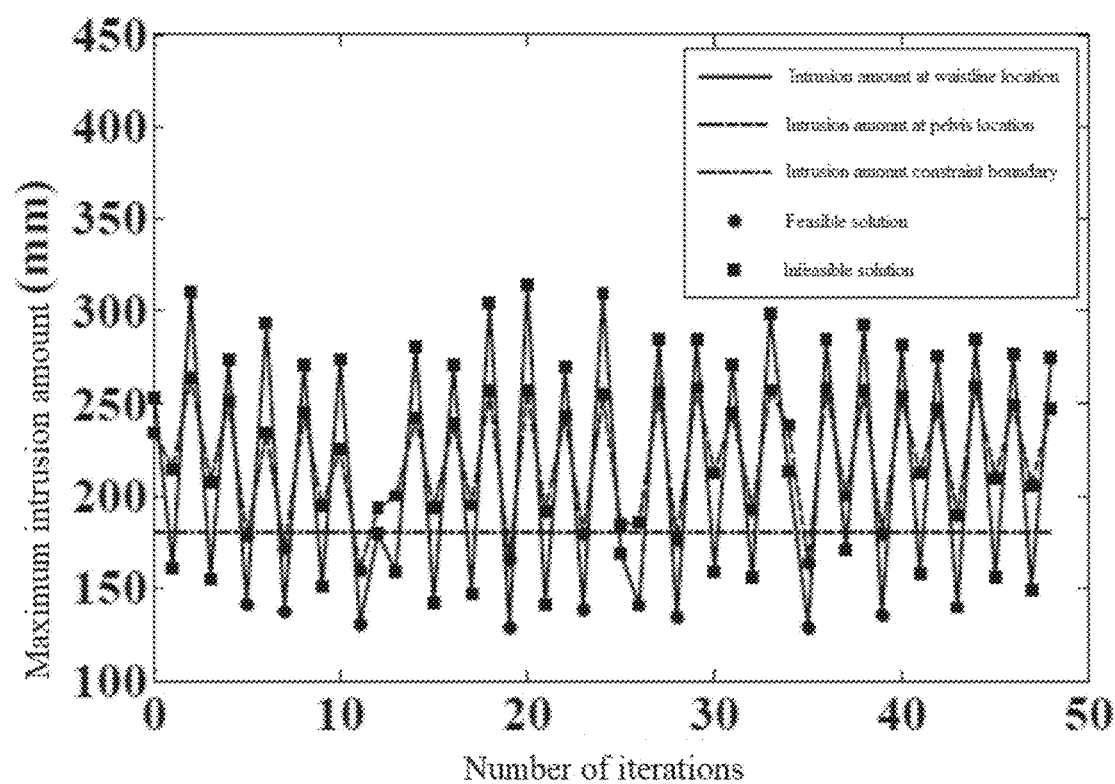
Figure 8C:
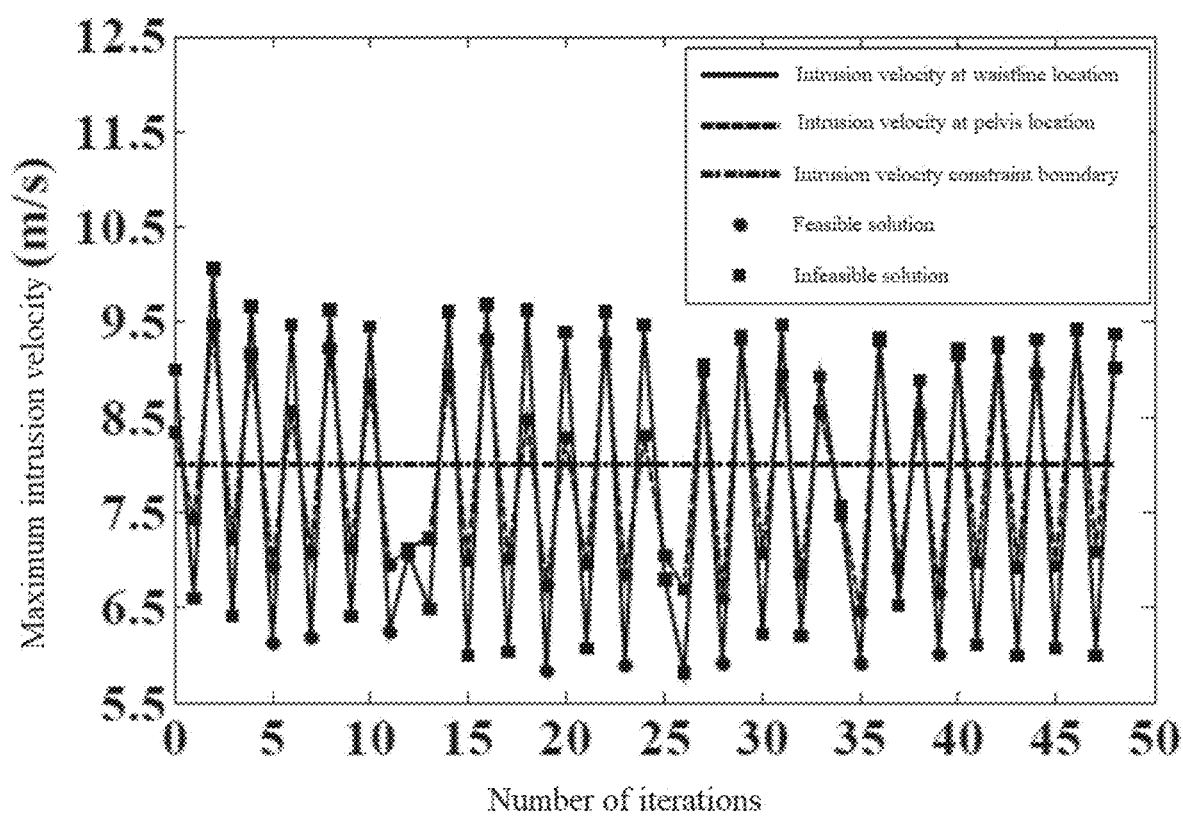
Figure 9A:
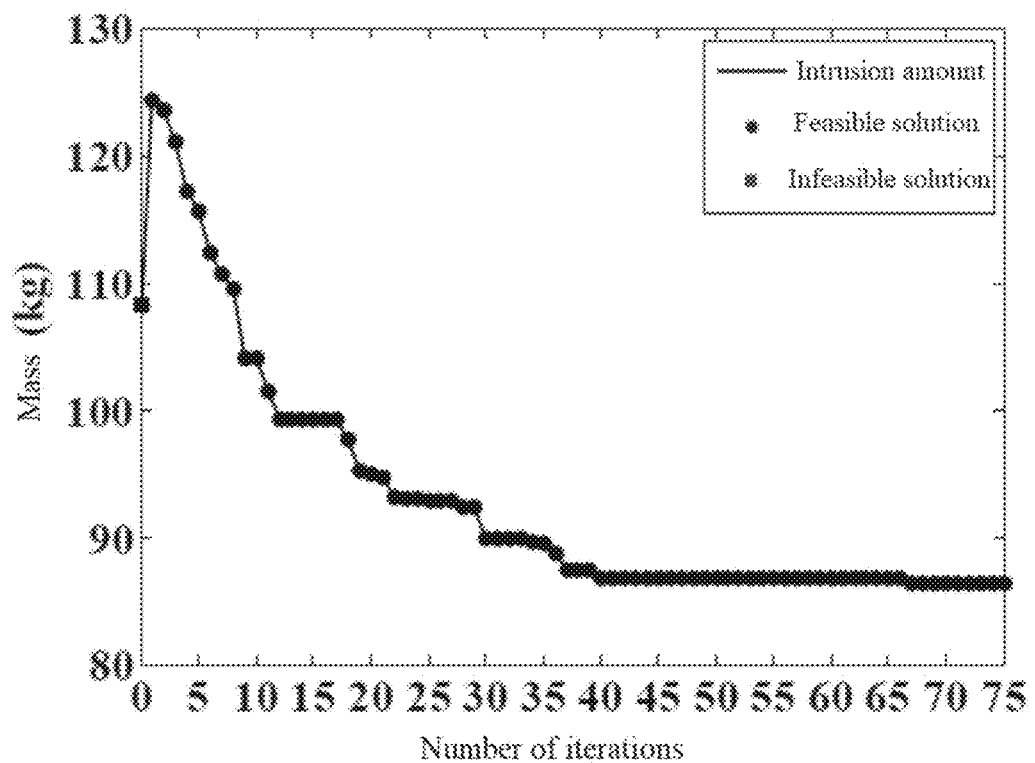
FIGS. 9A-9C are curve diagrams of iteration processes of a parallel EGO-PCEI algorithm in the present invention, where
Figure 9B:
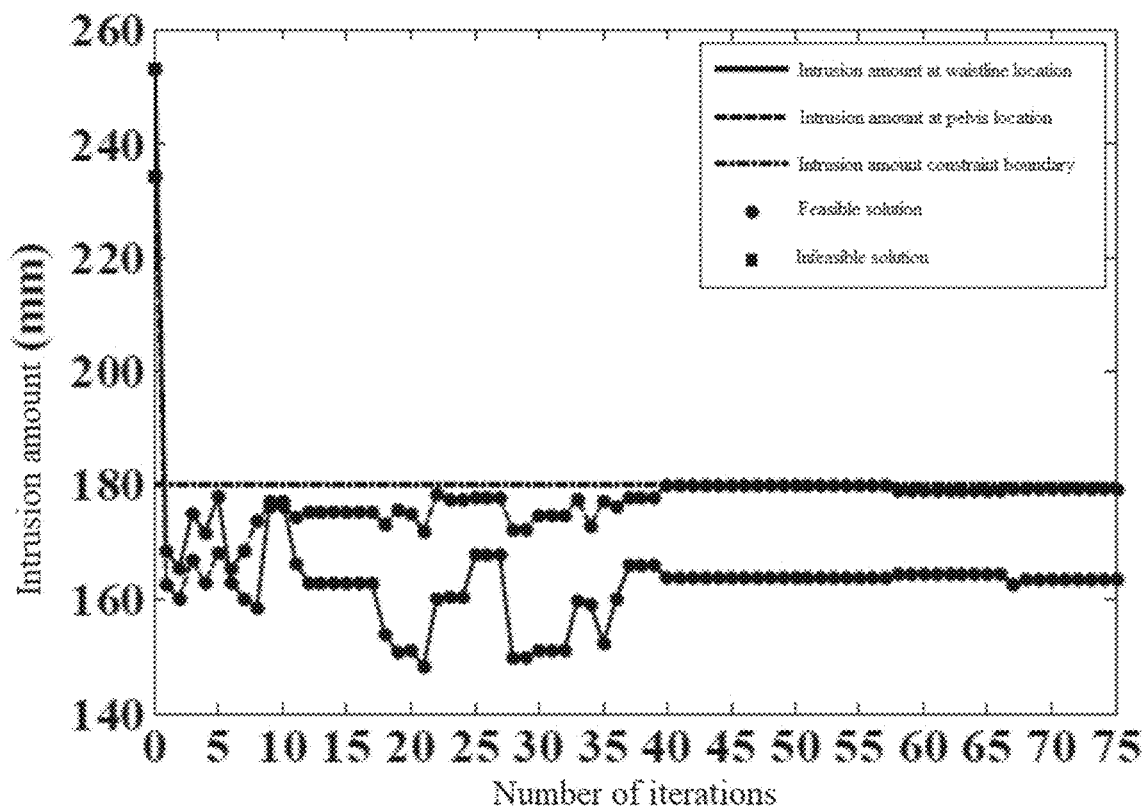
Figure 9C:
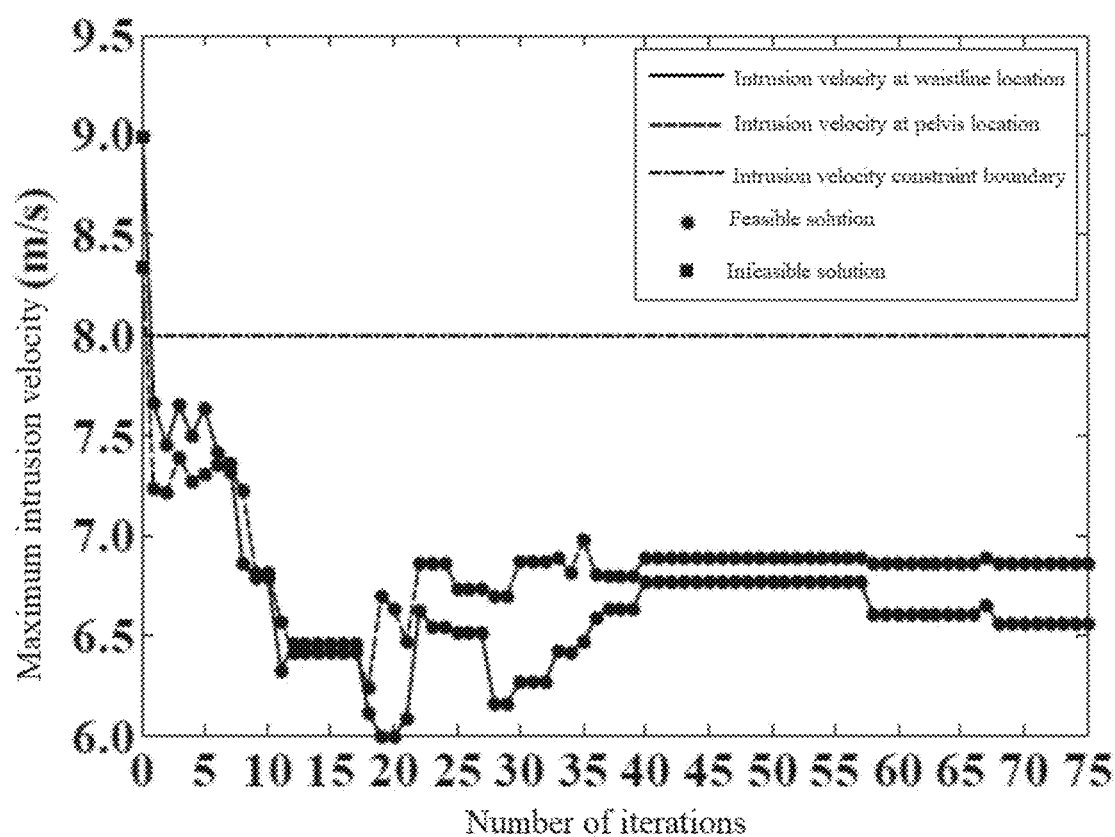
Figure 10A:
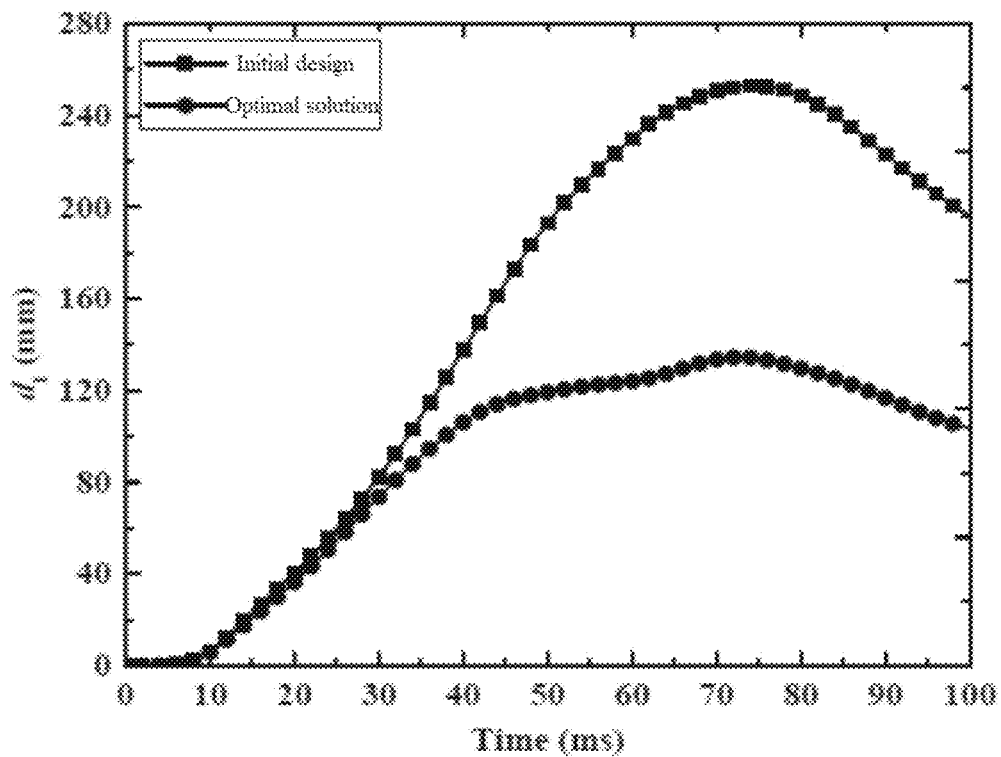
FIGS. 10A-10B are comparison diagrams of intrusion amount curves before and after optimization in the present invention, where
Figure 10B:
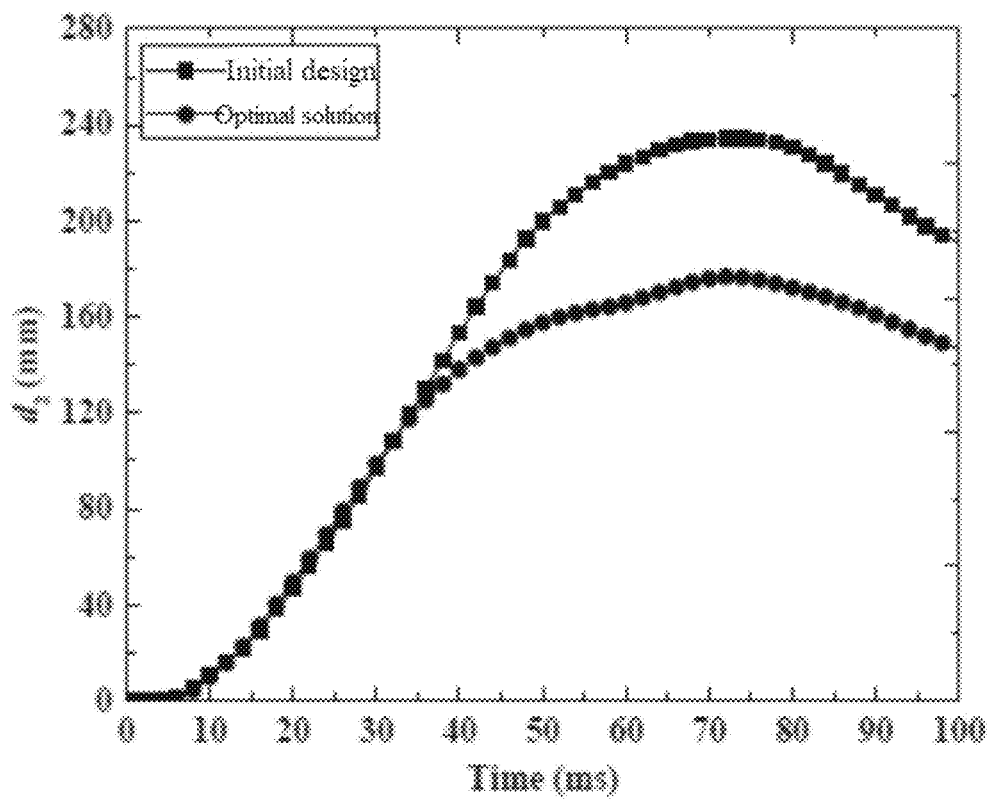
Figure 11A:
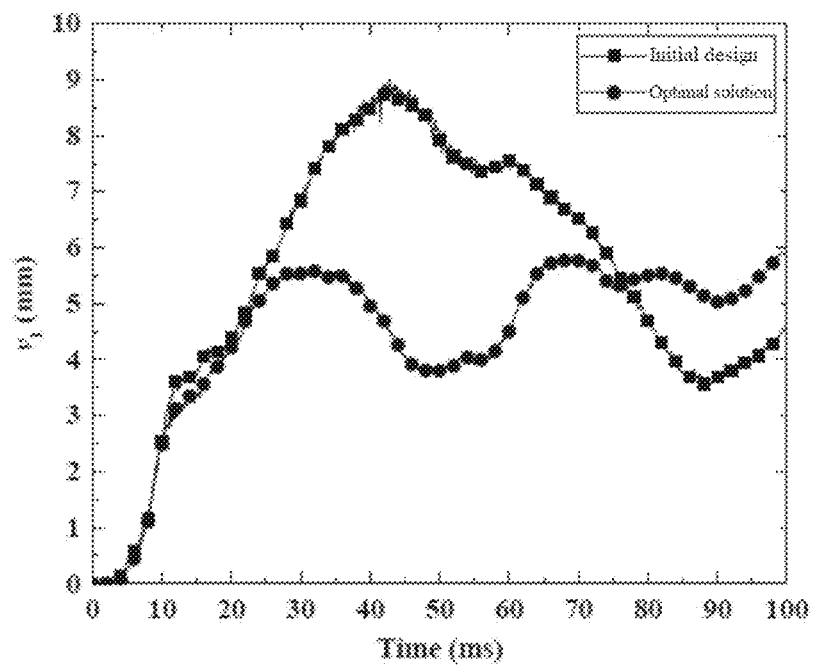
FIGS. 11A-11B are comparison diagrams of intrusion velocity curves before and after optimization in the present invention, where
Figure 11B:
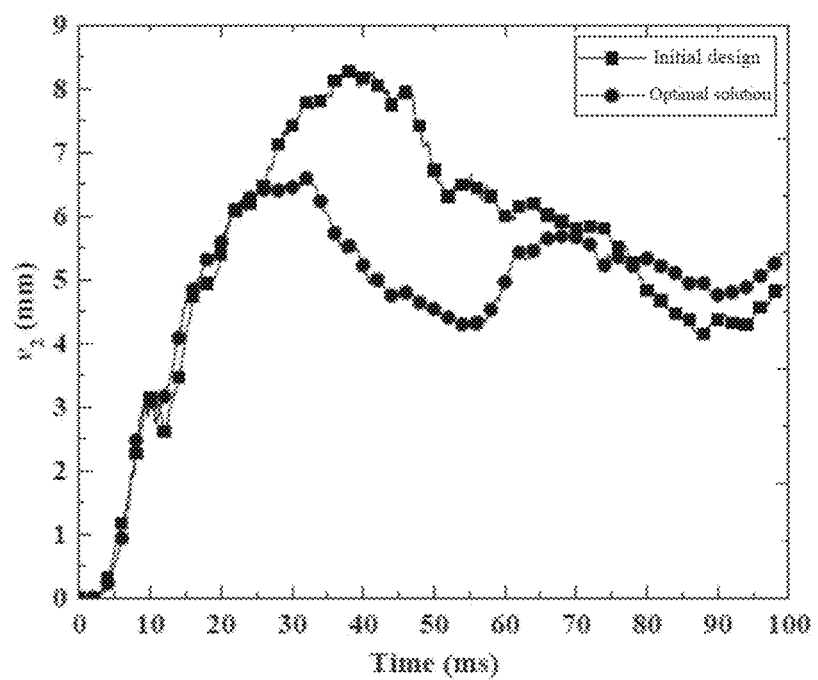

FIGS. 7A-7C illustrate curves of iteration processes of a T-Subdomain HCA #1 algorithm. According to FIGS. 7A-7C, the T-Subdomain HCA #1 algorithm converges after 48 iterations, an optimal solution is found in the $3^{rd}$ iteration, and a total of 48 finite element analyses are conducted. FIGS. 8A-8C illustrate curves of iteration processes of a T-Subdomain HCA #2 algorithm. According to FIGS. 8A-8C, the T-Subdomain HCA #2 algorithm converges after 49 iterations, an optimal solution is found in the $28^{th}$ iteration, and a total of 49 finite element analyses are conducted. Upon comparison between FIGS. 7A-7C and FIGS. 8A-8C, a target function of the T-Subdomain HCA #1 algorithm no longer decreases in the vicinity of 100 kg and rapidly converges to a local optimal solution, while a target function of the T-Subdomain HCA #2 algorithm still rapidly decreases after reaching 90 kg and the algorithm converges when decreasing to 85.40 kg. FIG. 9A-9C illustrate curves of iteration processes of a parallel EGO-PCEI algorithm. According to FIGS. 9A-9C, a target function of the parallel EGO-PCEI algorithm converges more slowly after decreasing to 90 kg, a global optimal solution is found in the $68^{th}$ iteration, and the algorithm reaches a convergence condition after 300 finite element analyses are conducted. Table 4 records statistics of the number of finite element analyses when the T-Subdomain HCA #1 algorithm, the T-Subdomain HCA #2 algorithm, and the parallel EGO-PCEI algorithm converge to the optimal solutions and response values of the optimal solutions.

TABLE 4

Comparison between optimal solutions of T-Subdomain HCA#1, T-Subdomain HCA#2, and parallel EGO-PCEI algorithms

|  | T-Subdomain HCA#1 | T-Subdomain HCA#2 | parallel EGO-PCEI |
|---|---|---|---|
| M(x) (kg) | 99.36 | 85.40 | 86.45 |
| $d_1(x)$ (mm) | 154.40 | 134.60 | 162.70 |
| $d_2(x)$ (mm) | 171.10 | 176.70 | 180.00 |
| $v_1(x)$ (m/s) | 7.19 | 5.97 | 6.65 |
| $v_2(x)$ (m/s) | 7.02 | 6.60 | 6.89 |
| Number of finite element analyses when converging to optimal solution | 37 | 28 | 273 |
| Total number of finite element analyses | 48 | 49 | 300 |

Upon comparison and analysis of FIGS. 7A-7C, FIG. 8A-8C, FIG. 9A-9C, and Table 5, the T-Subdomain HCA #1 algorithm easily traps into a local optimal solution; the T-Subdomain HCA #2 algorithm not only has a high optimization efficiency, but also has a stronger global search capability; the global optimization capability of the T-Subdomain HCA #2 algorithm equals that of the parallel EGO-PCEI algorithm, but the optimization efficiency thereof is obviously higher than that of the parallel EGO-PCEI algorithm. Thus, the T-Subdomain HCA algorithm provided in the present invention has high optimization efficiency and precision for solving time-consuming and multi-variable nonlinear dynamic response optimization problems, and meanwhile the effectiveness of the algorithm is verified.

Next, the specific effects of using a T-Subdomain HCA algorithm based on a target internal energy density function to perform crashworthiness optimization and lightweight design for a car body structure under vehicle side impact loading. Table 5 lists the total weight of the 34 parts and performance improvement percentage of vehicle side impact before and after optimization. According to Table 5, the optimal solution obtained in the T-Subdomain HCA algorithm based on the step target internal energy density function can achieve a weight reduction effect of 21.64%, and meanwhile, $d_1(x)$ drops by 46.76%, $d_2(x)$ drops by 24.62%, $v_1(x)$ drops by 34.22%, and $v_2(X)$ drops by 20.48%. This algorithm not only reduces the total weight of the 34 parts to a large extent, but also significantly improves the safety in case of vehicle side impact.

TABLE 5

Performance improvement percentages before and after optimization

|  | M(x) (kg) | $d_1(x)$ (mm) | $d_2(x)$ (mm) | $v_1(x)$ (m/s) | $v_2(x)$ (m/s) |
|---|---|---|---|---|---|
| Initial design | 108.30 | 252.80 | 234.40 | 9.00 | 8.30 |
| Optimal solution | 85.40 | 134.60 | 176.70 | 5.92 | 6.60 |
| Relative change rate (%) | −21.64% | −46.76% | −24.62% | −34.22% | −20.48% |

Figure 12A:
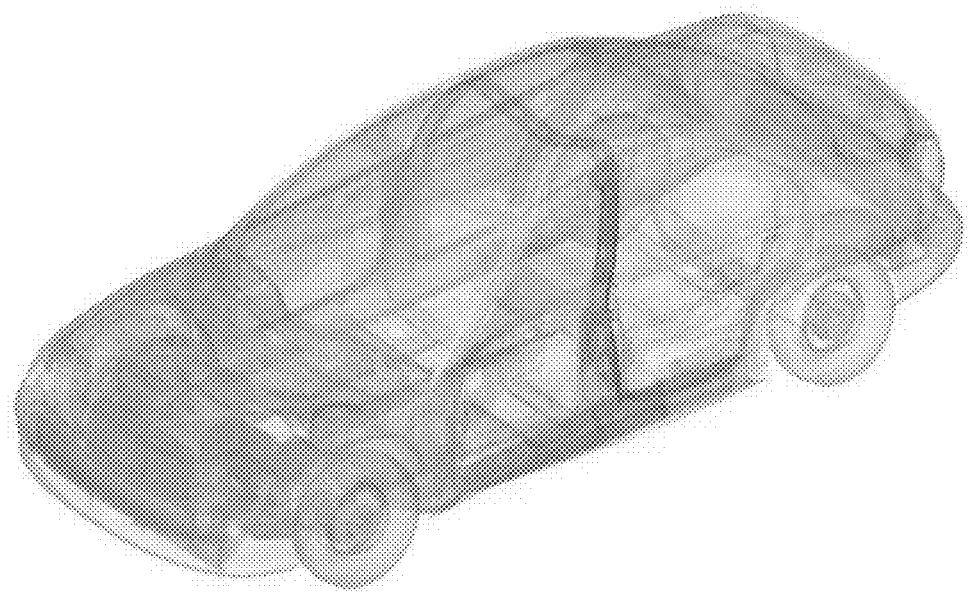
FIGS. 12A-12B are comparison diagrams of car body deformation patterns before and after optimization in the present invention, where
Figure 12B:
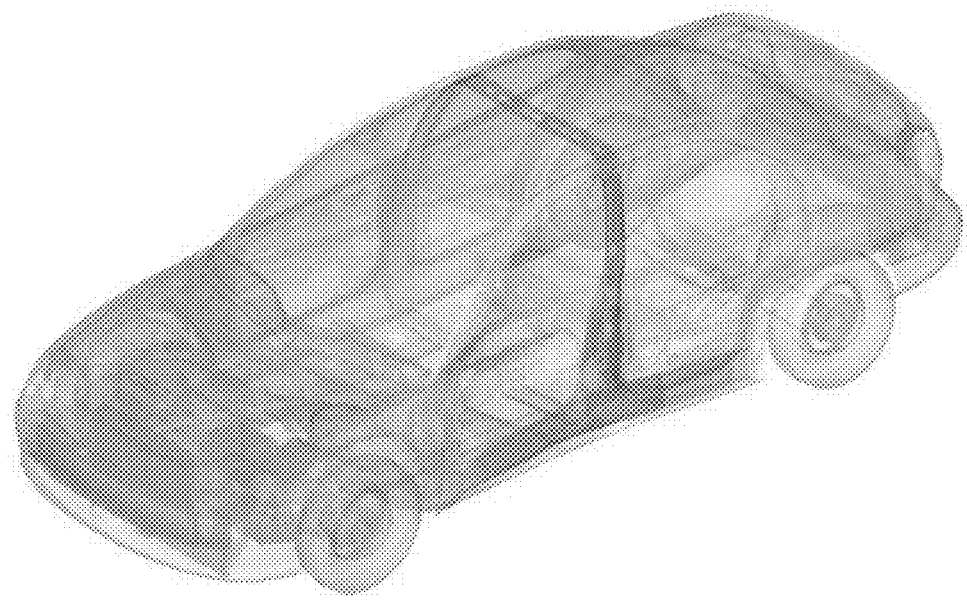

FIGS. 10A-10B and 11A-11B compare curves of intrusion amounts and intrusion velocities at B-pillar waistline location and pelvis location before and after optimization. FIGS. 12A-12B compare car body deformation patterns before and after optimization. According to FIGS. 10A-10B and FIGS. 12A-12B, the intrusion amount and intrusion velocity of the optimal solution are improved to a large extent as compared with the initial design; the B-pillar and roof middle crossbeam of the optimal solution are reinforced, and deformation patterns thereof are obviously improved as compared with the initial design.

The described embodiment is a preferred embodiment of the present invention, but the present invention is not limited to the aforementioned embodiment. Any obvious improvements, substitutions or modifications that can be made by those skilled in the art without departing from the essential content of the present invention shall fall within the protection scope of the present invention.

What is claimed is:

1. A subdomain hybrid cellular automata method for solving car body thickness optimization, comprising the following steps:
    S1. building an initially designed crash finite element model for thickness optimization of a car body structure;
    S2. building a cellular automata model for the thickness optimization of the car body structure in subdomains, wherein a cell internal energy density distribution for car body framework parts approaches a step target internal energy density function, the car body framework parts are selected from the group consisting of A-pillar, B-pillar, sill, roof-rail, front door, rear door, rear side member, seat crossbeam, front side member rear section, seat rear crossbeam, rear floor front crossbeam, roof front crossbeam, roof middle crossbeam and roof rear crossbeam, and defining thickness variables and field variables;

S3. executing an outer loop: obtaining a cell internal energy density and a constraint function value at a current design point for each of the car body framework parts through simulation analysis, and updating a target mass for each of the car body framework parts using a penalty function method according to an extent, wherein the current design point violates a constraint boundary to the extent;

S4. executing an inner loop:

S4.1. constructing a step target internal energy density function, and updating a target internal energy density for each of the car body framework parts;

wherein a process of constructing the step target internal energy density function is:

S4.1.1. according to subscripts i and j of a cell $\Omega_{i,j}$, defining a sequence number for the cell using id (i, j)=$\hat{N}_{\Omega_{i-1}}$*(i−1)+j, j∈[1, $\hat{N}_{\Omega_i}$], $\hat{N}_{\Omega_0}$=0, wherein $\hat{N}_{\Omega_{i-1}}$ is a number of cells in an (i−1)th subdomain;

S4.1.2. traversing all the cells, and calculating a difference between internal energy densities $S_{id}^{(k)}$ of all the cells and an average $\overline{S}^{(k)}$ of the internal energy densities in a kth outer loop: $\Delta S_{id}^{(k)} = S_{id}^{(k)} - \overline{S}^{(k)}$, wherein $$\overline{S}^{(k)} = \frac{1}{\sum_{i=1}^{l} \hat{N}_{\Omega_i}} \sum_{i=1}^{l} \sum_{j=1}^{\hat{N}_{\Omega_i}} S_{\Omega_{i,j}}^{(k)}$$

is the average of the internal energy densities of all the cells in the kth outer loop;

S4.1.3. determining "step points" and "step intervals": traversing all the cells, and when $\Delta S_{id}^{(k)} * \Delta S_{id+1}^{(k)} < 0$ is established, defining a subscript id of $\Delta S_{id}^{(k)}$ as a "step point," wherein m "step points" form m+1 "step intervals";

S4.1.4. updating the "step points" and the "step intervals": if $id_{i+1} - id_i + 1 < H_{threshod}$ is established, when i=1, deleting a "step point" $id_1$, and a "step interval" is updated from [$id_0, id_1$] to [$id_0, id_2$]; when i>1, deleting a "step point" $id_{i-1}$, and the "step interval" is updated from [$id_{i-1}, id_i$] to [$id_{i-2}, id_i$]; if $id_{i+1} - id_i + 1 < H_{threshod}$ is not established, retaining the "step points" and "step intervals" of S4.1.3;

S4.1.5 constructing the step target internal energy density function:

$$S^{*(h,k)} = \begin{cases} S_1^{*(h,k)}, & 1 \le id \le id_1 \\ S_2^{*(h,k)}, & id_1 < id \le id_2 \\ \ldots \\ S_i^{*(h,k)}, & id_{i-1} < id \le id_i \\ \ldots \\ S_{m'}^{*(h,k)}, & id_{m'-1} < id \le id_{m'} \\ S_{m'+1}^{*(h,k)}, & id_{m'} < id \le \sum_{i=1}^{l} \hat{N}_{\Omega_i} \end{cases}$$

wherein $S_i^{*(h,k)}$ is a target internal energy density in the "step interval" [$id_{i-1}, id_i$] in the kth outer loop and an hth inner loop, S4.2. updating a cell thickness using cell thickness update rules based on a PID control strategy;

S4.3. judging whether the inner loop converges: if a convergence condition is not satisfied, returning to S4.1; if the convergence condition is satisfied, exiting the inner loop and performing S5;

S5. judging whether the outer loop converges: if global convergence conditions are not satisfied, returning to S3 and updating the cell thickness using the inner loop; if the global convergence conditions are satisfied, outputting a crashworthiness optimization design of a car body based upon internal energy densities of the car body framework parts.

2. The subdomain hybrid cellular automata method for solving car body thickness optimization according to claim 1, wherein the cellular automata model defined for each of the subdomains comprises a current cell and neighboring cells of the current cell.

3. The subdomain hybrid cellular automata method for solving car body thickness optimization according to claim 2, wherein a cell type comprises one-dimensional cellular automata, two-dimensional cellular automata, and three-dimensional cellular automata.

4. The subdomain hybrid cellular automata method for solving car body thickness optimization according to claim 1, wherein a formula used in updating the target internal energy density is:

$$S_i^{*(h+1,k)} = S_i^{*(h,k)} \frac{M^{(h,k)}}{M^{*(k)}}$$

wherein $M^{*(k)}$ represents a target mass obtained by update in the kth outer loop; $M^{(h,k)}$ represents a current mass obtained by thickness update in the kth outer loop and the hth inner loop.

5. The subdomain hybrid cellular automata method for solving car body thickness optimization according to claim 1, wherein the cell thickness update rules based on the PID control strategy comprise:

a cell thickness update formula as follows:

$$t_{\Omega_{i,j}}^{(h+1,k)} = \begin{cases} t_{\Omega_{i,j}}^{min}, & t_{\Omega_{i,j}}^{(h,k)} + \Delta t_{\Omega_{i,j}}^{(h,k)} < t_{\Omega_{i,j}}^{min} \\ t_{\Omega_{i,j}}^{(h,k)} + \Delta t_{\Omega_{i,j}}^{(h,k)}, & t_{\Omega_{i,j}}^{min} \le t_{\Omega_{i,j}}^{(h,k)} + \Delta t_{\Omega_{i,j}}^{(h,k)} \le t_{\Omega_{i,j}}^{max} \\ t_{\Omega_{i,j}}^{max}, & t_{\Omega_{i,j}}^{(h,k)} + \Delta t_{\Omega_{i,j}}^{(h,k)} > t_{\Omega_{i,j}}^{max} \end{cases}$$

wherein $t_{\Omega_{i,j}}^{(h,k)}$ is a cell thickness of a jth cell in an ith subdomain $\Omega_i$ in the kth outer loop and the hth inner loop; $t_{\Omega_{i,j}}^{(h+1,k)}$ is a cell thickness of the jth cell in the ith subdomain $\Omega_i$ in the kth outer loop and an (h+1)th inner loop; $t_{\Omega_{i,j}}^{min}$ and $t_{\Omega_{i,j}}^{max}$ are respectively a minimum and a maximum of the cell thickness of the jth cell in the ith subdomain $\Omega_i$ in the kth outer loop and the hth inner loop; $\Delta t_{\Omega_{i,j}}^{(h,k)}$ is a variation of the cell thickness of the jth cell in the ith subdomain $\Omega_i$ in the kth outer loop and the hth inner loop, and has an expression as follows:

$$\Delta t_{\Omega_{i,j}}^{(h,k)} = (t_{\Omega_{i,j}}^{max} - t_{\Omega_{i,j}}^{min}) f(e_{\Omega_{i,j}}^{(h,k)})$$

wherein $f(e_{\Omega_{i,j}}^{(h,k)})$ is a PID control function for cell thickness update, and has an expression as follows:

$$f(e_{\Omega_{i,j}}^{(h,k)}) = K_p e_{\Omega_{i,j}}^{(h,k)} + K_i \left[ e_{\Omega_{i,j}}^{(h,k)} + \sum_{\tau=1}^{k-1} e_{\Omega_{i,j}}^{(\tau)} \right] + K_d \times \left[ e_{\Omega_{i,j}}^{(h,k)} - e_{\Omega_{i,j}}^{(k-1)} \right]$$

wherein $K_p$ is a proportional control coefficient, $K_i$ is an integral control coefficient, $K_d$ is a differential control coefficient, $e_{\Omega_{i,j}}^{(\tau)}$ represents a relative deviation item of a τth outer loop, $e_{\Omega_{i,j}}^{(k-1)}$ represents a relative deviation item of a (k−1)th outer loop, and $e_{\Omega_{i,j}}^{(h,k)}$ represents a relative deviation item between an internal energy density $S_{\Omega_{i,j}}^{(k)}$ of a current cell and a target internal energy density $S_{m'}^{*(h,k)}$, and has a calculation formula as follows:

$$e_{\Omega_{i,j}}^{(h,k)} = \frac{S_{\Omega_{i,j}}^{(k)} - S_{m'}^{*(h,k)}}{S_{m'}^{*(h,k)}}.$$

6. The subdomain hybrid cellular automata method for solving car body thickness optimization according to claim 1, wherein the convergence condition of the inner loop is: $|M^{(h,k)} - M^{*(k)}| < \varepsilon_1$ or $k_1 \geq k_{1max}$, wherein $M^{*(k)}$ represents a target mass obtained by update in the kth outer loop; $M^{(h,k)}$ represents a current mass obtained by thickness update in the kth outer loop and the hth inner loop, $\varepsilon_1$ is a mass convergence factor, $k_1$ represents a number of iterations in the inner loop, and $k_{1max}$ represents a maximum number of iterations in the inner loop.

7. The subdomain hybrid cellular automata method for solving car body thickness optimization according to claim 1, wherein the global convergence conditions comprise:
(1) when a number of iterations k in the outer loop exceeds a predefined maximum number of iterations $k_{max}$, terminating iteration;
(2) $p_f$ represents a number of iterations where infeasible solutions continuously appear, and $P^*_f$ represents a maximum number of iterations where infeasible solutions continuously appear; when $p_f > p_f^*$, terminating iteration;
(3) when a variation of design variables satisfies $$\sum_{i=1}^{N} |t_{\Omega_{i,j}}^{k} - t_{\Omega_{i,j}}^{k-1}| < \varepsilon_2,$$

wherein N represents a total number of the cells, and $\varepsilon_2$ represents a global convergence factor, terminating iteration.

* * * * *